(12) United States Patent
Miller et al.

(10) Patent No.: US 12,707,145 B2
(45) Date of Patent: Aug. 11, 2026

(54) CAMERA FOCUSING FOR VIDEO PASSTHROUGH SYSTEMS

(71) Applicant: Apple Inc., Cupertino, CA (US)

(72) Inventors: Brett D Miller, San Carlos, CA (US); Bosheng Zhang, Sunnyvale, CA (US); Kathrin Berkner Cieslicki, Los Altos, CA (US); Stephane P Bersot, San Mateo, CA (US); Noah D Bedard, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 44 days.

(21) Appl. No.: 18/888,034

(22) Filed: Sep. 17, 2024

(65) Prior Publication Data

US 2025/0106506 A1 Mar. 27, 2025

Related U.S. Application Data

(60) Provisional application No. 63/585,183, filed on Sep. 25, 2023.

(51) Int. Cl.
*H04N 23/67* (2023.01)
*G06F 3/01* (2006.01)
*H04N 23/62* (2023.01)

(52) U.S. Cl.
CPC ............. *H04N 23/67* (2023.01); *G06F 3/013* (2013.01); *H04N 23/62* (2023.01)

(58) Field of Classification Search
CPC ........ H04N 23/67; H04N 23/62; G06F 3/013; G02B 27/0172; G02B 27/0093; G02F 1/29
See application file for complete search history.

(56) References Cited

U.S. PATENT DOCUMENTS 10,223,808 B2 3/2019 Hoffmann et al.
10,666,856 B1 5/2020 Rueckner
10,979,685 B1 4/2021 Silverstein
2006/0098087 A1 5/2006 Brandt et al.
2015/0003819 A1 1/2015 Ackerman et al.
2020/0393896 A1* 12/2020 Li .......................... G06F 3/013
2021/0278630 A1* 9/2021 Lee .......................... G02F 1/29
2023/0119935 A1* 4/2023 Sztuk ................ G02B 27/0172 345/8
2024/0211035 A1* 6/2024 Zhang ................ G02B 27/0093
2025/0199607 A1* 6/2025 Hu .................... G02B 27/0172

FOREIGN PATENT DOCUMENTS

EP 3605196 A1 2/2020

OTHER PUBLICATIONS

Interntation Search Report and Written Opinion from PCT/US2024/047550, mailed Dec. 12, 2024, pp. 1-16.

* cited by examiner

*Primary Examiner* — Hung H Lam
(74) *Attorney, Agent, or Firm* — Robert C. Kowert; Kowert, Hood, Munyon, Rankin & Goetzel, P.C.

(57) ABSTRACT

Methods and apparatus for camera focusing for video passthrough devices. Gaze information from a gaze tracking subsystem, either alone or along with depth information from a depth tracking system, may be leveraged to determine depths at which to focus. Gaze information, or a combination of depth and gaze information, may be used. As an alternative, the user can manually control the focus distance. For example, a manual bifocal method may provide two focus distances (near focus and far focus.

20 Claims, 19 Drawing Sheets

CAMERA FOCUSING FOR VIDEO PASSTHROUGH SYSTEMS

PRIORITY CLAIM

This application claims benefit of priority to U.S. Provisional Application Ser. No. 63/585,183, entitled "Camera Focusing for Video Passthrough Systems," filed Sep. 25, 2023, and which is hereby incorporated herein by reference in its entirety.

BACKGROUND

Extended reality (XR) systems such as mixed reality (MR) or augmented reality (AR) systems combine computer generated information (referred to as virtual content) with real world images or a real-world view to augment, or add content to, a user's view of the world. XR systems may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and apparatus for camera focusing for video passthrough on a device, for example head-mounted devices (HMDs) including but not limited to HMDs used in extended reality (XR) applications and systems, are described. HMDs may include wearable devices such as headsets, helmets, goggles, or glasses. An XR system may include an HMD which may include one or more cameras that may be used to capture still images or video frames of the user's environment. The HMD may include lenses positioned in front of the eyes through which the wearer can view the environment. In XR systems, virtual content may be displayed on or projected onto these lenses to make the virtual content visible to the wearer while still being able to view the real environment through the lenses. An XR system in which world-facing cameras are used to capture video of the environment that is then displayed on display screen(s) in front of the user's eyes may be referred to as a video passthrough system.

In an HMD in which world-facing cameras are used to capture video of the environment that is then displayed on display screen(s) in front of the user's eyes (i.e., a video passthrough system), a challenge is to have a good, sharp image for the user at every working distance. In conventional systems, the lenses are fixed focused, which requires the compromise of a limited depth of focus (DoF) at a certain distance from the HMD. For most tasks, objects and surfaces in an environment that are at a sufficient distance are rendered sharply on the display. However, close objects, for example objects within half a meter or less of the HMD, may appear out-of-focus, blurry, to the user when displayed. For example, if the user holds a cellphone in front of the display, the displayed cellphone may be out of focus.

Various embodiments of methods and apparatus for camera focusing for video passthrough devices (e.g., video passthrough HMDs) are described. In some embodiments, rather than using a fixed focus camera with a limited DoF, a variable focus camera may be used along with various gaze-based techniques for determining the depths to focus at to automatically focus at the different depths, including on objects that are close to the HMD. Thus, embodiments overcome the limitation of conventional video passthrough systems in HMDs.

In some embodiments, gaze information from a gaze tracking subsystem or gaze tracker, either alone or along with depth information from a depth tracking system, may be leveraged to determine depths at which to focus. Several embodiments using gaze information, or a combination of depth and gaze information, are described.

For certain users or a certain segment of the population, the gaze-driven focusing techniques may not work well, for example due to the physiology of the users' eyes. As an alternative, embodiments are also described in which the user can manually control the focus distance. For example, a manual bifocal method is described that may provide two focus distances (near focus and far focus), similar to conventional bifocal lenses in glasses.

Figure 1:
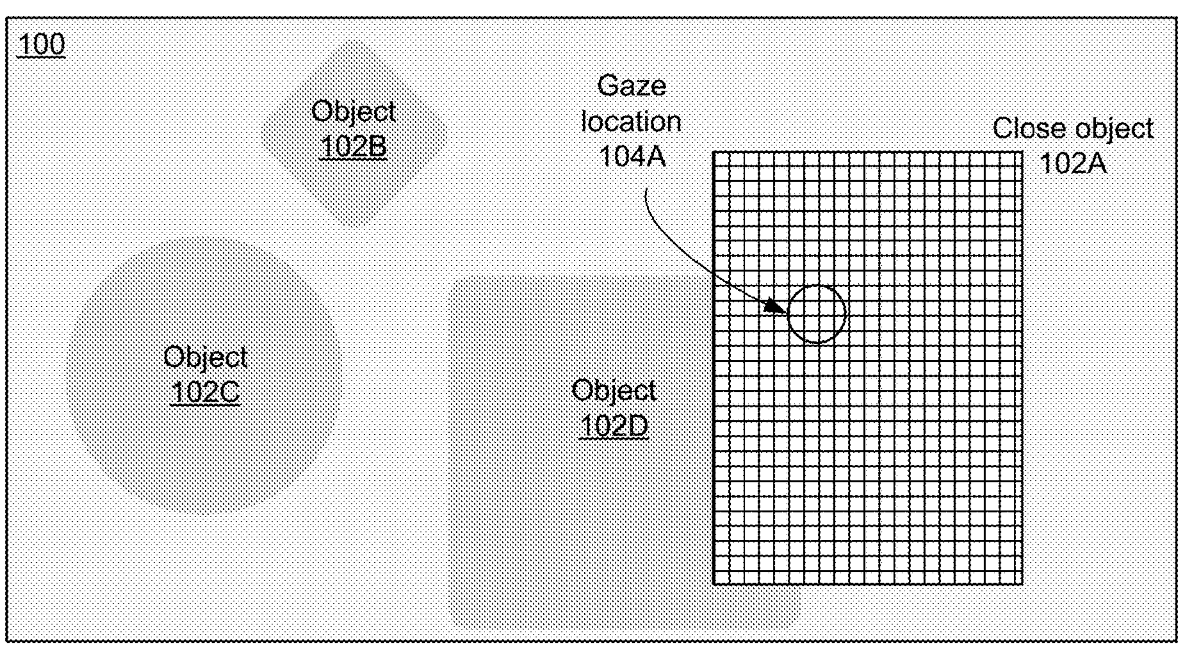
FIG. 1 graphically illustrates gaze-driven camera focus for video pass-through systems, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware-for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for camera focusing for video passthrough on a device, for example head-mounted devices (HMDs) including but not limited to HMDs used in extended reality (XR) applications and systems, are described. HMDs may include wearable devices such as headsets, helmets, goggles, or glasses. An XR system may include an HMD which may include one or more cameras that may be used to capture still images or video frames of the user's environment. The HMD may include lenses positioned in front of the eyes through which the wearer can view the environment. In XR systems, virtual content may be displayed on or projected onto these lenses to make the virtual content visible to the wearer while still being able to view the real environment through the lenses. An XR system in which world-facing cameras are used to capture video of the environment that is then displayed on display screen(s) in front of the user's eyes may be referred to as a video passthrough system.

In at least some systems, the HMD may include gaze tracking technology. In an example gaze tracking subsystem or gaze tracker, one or more infrared (IR) light sources emit IR light towards a user's eye. A portion of the IR light is reflected off the eye and captured by an eye tracking camera. Images captured by the eye tracking camera may be input to a glint and pupil detection process, for example implemented by one or more processors of a controller of the HMD. Results of the process are passed to a gaze estimation process, for example implemented by one or more processors of the controller, to estimate the user's current point of gaze. This method of gaze tracking may be referred to as PCCR (Pupil Center Corneal Reflection) tracking. Note that the gaze tracking may be performed for one or for both eyes. Gaze information may be used for several functions of the HMD, for example, a gaze vector may be used to determine in which direction/angle a user is looking in an environment. As another example, in some embodiments, gaze vectors may be determined for both eyes, and an intersection of the two gaze vectors may be used to determine vergence of the eyes, which may indicate at what or where in an environment the user is looking.

In at least some systems, the HMD may include depth tracking technology. In an example depth tracking system, one or more depth cameras and/or other depth sensors may be used to collect depth data that is processed to determine depth (distance from the HMD) of objects and surfaces in the room. Depth information (e.g., depth maps) may be used for several functions of the HMD, for example, depth information may be used in associating virtual content with objects or surfaces in the environment.

In an HMD in which world-facing cameras are used to capture video of the environment that is then displayed on display screen(s) in front of the user's eyes (i.e., a video passthrough system), a challenge is to have a good, sharp image for the user at every working distance. In conventional systems, the lenses are fixed focused, which requires the compromise of a limited depth of focus (DoF) at a certain distance from the HMD. For most tasks, objects and surfaces in an environment that are at a sufficient distance are rendered sharply on the display. However, close objects, for example objects within half a meter or less of the HMD, may appear out-of-focus, blurry, to the user when displayed. For example, if the user holds a cellphone in front of the display, the displayed cellphone may be out of focus.

Various embodiments of methods and apparatus for camera focusing for video passthrough devices (e.g., video passthrough HMDs) are described. In some embodiments, rather than using a fixed focus camera with a limited DoF, a variable focus camera may be used along with various gaze-based techniques for determining the depths to focus at to automatically focus at the different depths, including on objects that are close to the HMD. Thus, embodiments overcome the limitation of conventional video passthrough systems in HMDs.

In some embodiments, gaze information from a gaze tracking subsystem or gaze tracker, either alone or along with depth information from a depth tracking system, may be leveraged to determine depths at which to focus. Several embodiments using gaze information, or a combination of depth and gaze information, are described.

For certain users or a certain segment of the population, the gaze-driven focusing techniques may not work well, for example due to the physiology of the users' eyes. As an alternative, embodiments are also described in which the user can manually control the focus distance. For example, a manual bifocal method is described that may provide two focus distances (near focus and far focus), similar to conventional bifocal lenses in glasses.

FIG. 1 graphically illustrates camera focusing for video pass-through systems, according to some embodiments. An environment 100 in front of an HMD that uses video passthrough technology may include several objects 102 or surfaces at different distances. Object 102A may be a close object for example within a half meter of the HMD. The other objects 102B-102D may be at different, farther distances in the environment. Depth tracking technology may be used to determine depth of the various objects 102, and a depth map may be constructed. Gaze tracking information (and the depth map) may be used to determine a gaze location 104, and thus an object 102 that the user appears to be looking at, in this case object 102A. Depth information for object 102A may then be used to drive the autofocus camera to focus at a depth corresponding to object 102A. If the gaze location 104 moves, for example to be clearly on object 102D, then depth information for the new location may be used to drive the autofocus camera to focus at the new depth. Note, however, that ambiguities may arise, for example if the gaze location 104 is at or near the boundary of objects 102A and 102D in this example.

Figure 2A:
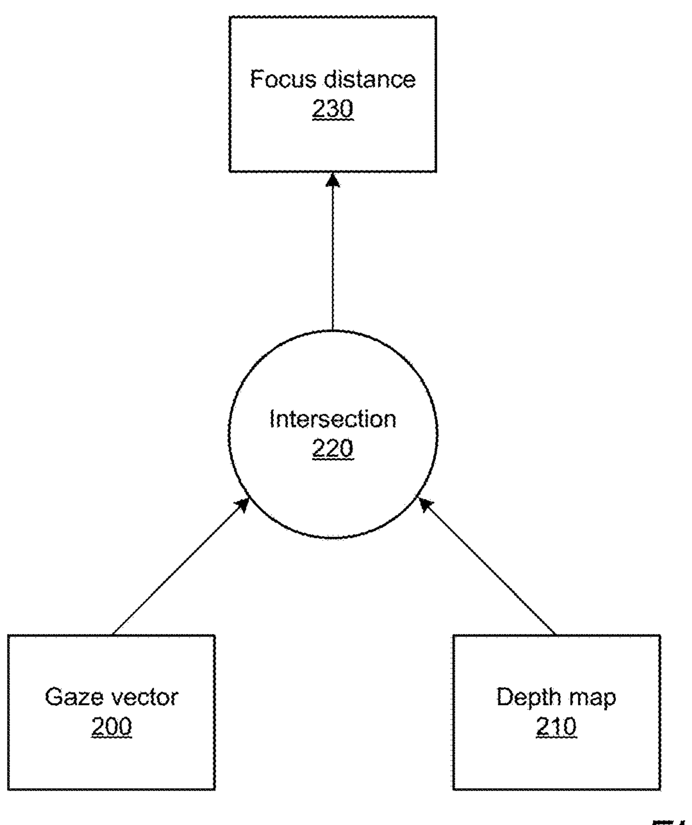
FIGS. 2A and 2B illustrate a depth-based focus method, according to some embodiments.
Figure 2B:
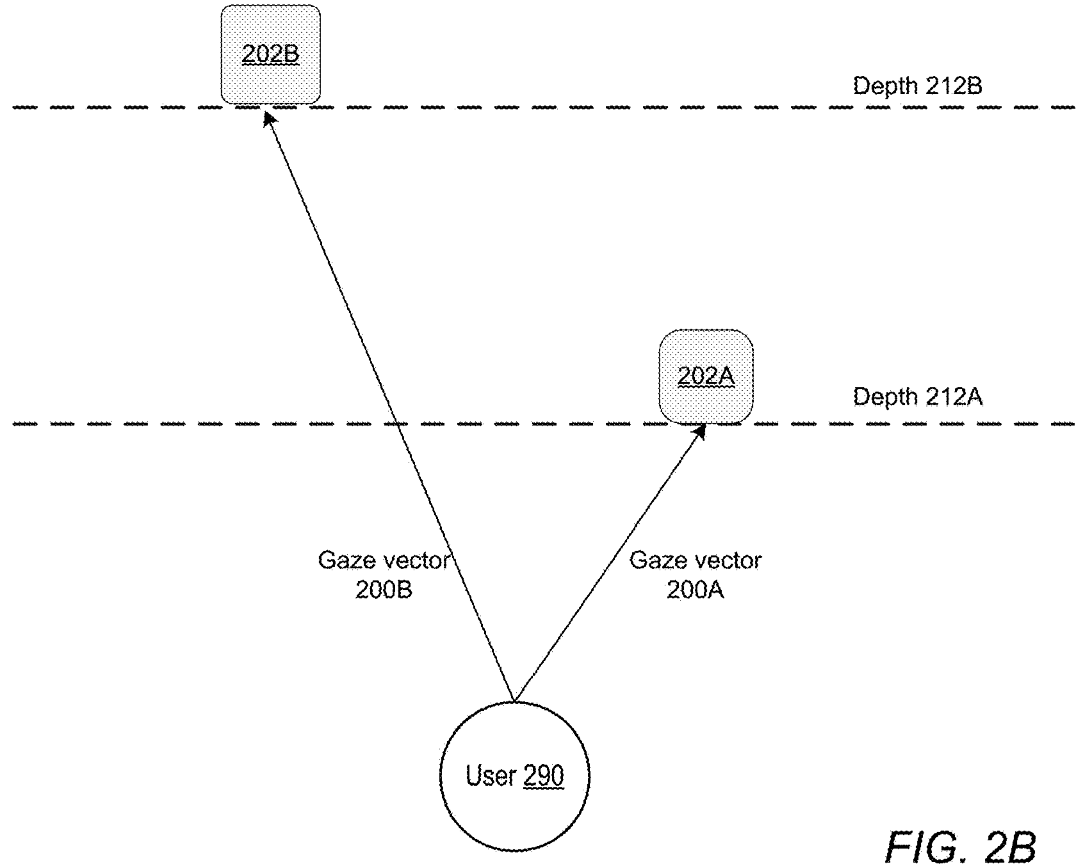

FIGS. 2A and 2B illustrate a depth-based focus method, according to some embodiments. In this embodiment, as shown in FIG. 2A, gaze tracking technology is used to determine a gaze vector 200 for the user, an intersection 220 of the gaze vector 200 with an object or surface in a depth map 210 is determined, and depth information corresponding to that object or surface is used to drive the camera to focus at focus distance 230. As shown in FIG. 2B, a user 290 looks towards object 202A at depth 212A. Gaze vector 200A is determined, an intersection with object 202A in the depth map 210 is determined, and the camera is driven to focus at depth 212A. If the user moves their gaze to look at object 202B at depth 212B, gaze vector 200B is determined, an intersection with object 202B in the depth map 210 is determined, and the camera is driven to focus at depth 212B.

Note that as the user 290 turns their head, moves about in the environment, or moves an object (for example, moving their hand that holds a cellphone in front of the HMD), the depth tracking technology dynamically updates the depth map 210, the gaze vector 200 is updated, and object 202/depth 212 information determined from the gaze vector 200 and depth map 210 may be dynamically updated, which may in turn drive the camera to continuously and dynamically focus at new depths during use.

This depth-based method may work well in most cases. However, ambiguities may arise, for example if the gaze location is at or near the boundary of objects in a scene, which may cause the autofocus functionality to switch rapidly between different depths. In addition, this method depends on the reliability of the depth information, which may in some cases or conditions not be precisely accurate, and thus may result in focusing at the wrong depth.

Figure 3A:
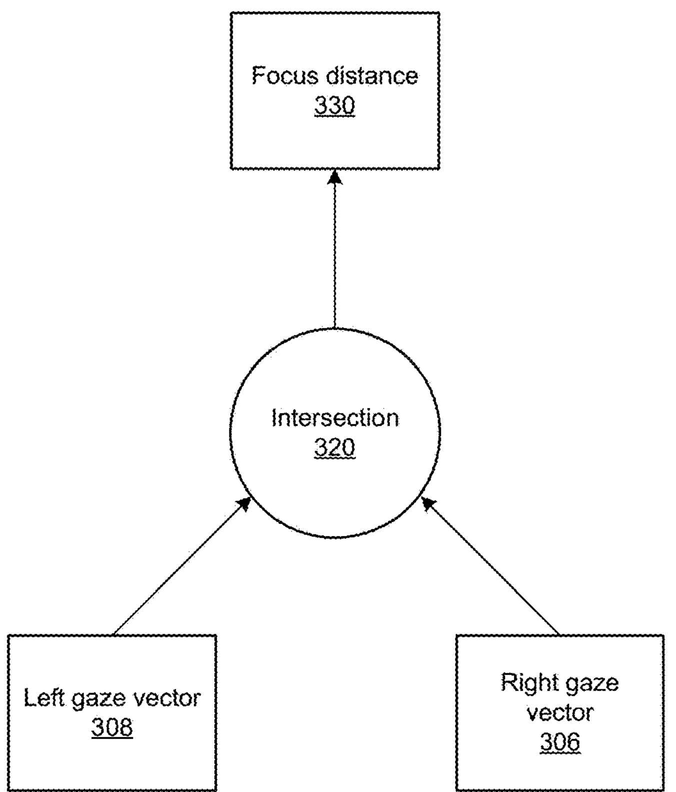
FIGS. 3A and 3B illustrate a vergence-based focus method, according to some embodiments.
Figure 3B:
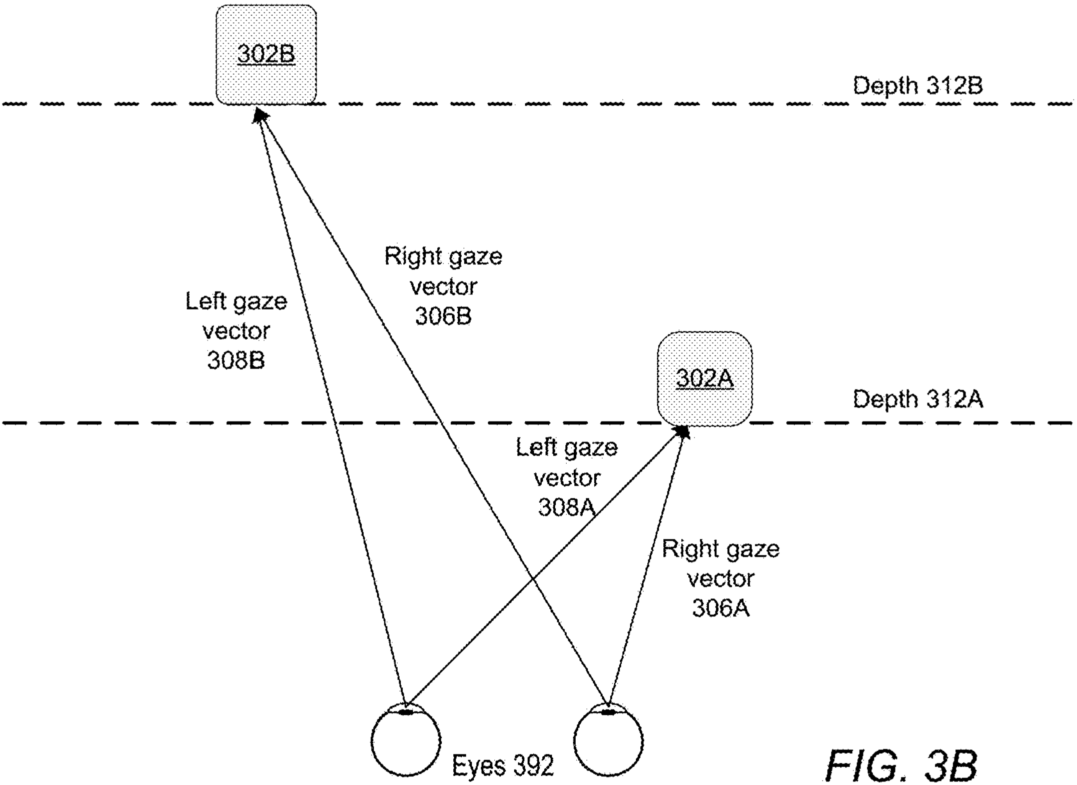

FIGS. 3A and 3B illustrate a vergence-based focus method, according to some embodiments. Instead of using a binocular gaze vector as illustrated in FIGS. 2A and 2B, these embodiments use gaze vectors from both eyes to estimate distance based on vergence of the left and right gaze vectors. The depth map may not be used in these embodiments. As shown in FIG. 3A, gaze tracking technology is used to determine a left gaze vector 308 for the user's left eye and a right gaze vector 306 for the user's right eye, and an intersection 320 of the gaze vectors 306 and 308 are used to determine a focus distance 330, which is used to drive the camera to focus at that focus distance 230. As shown in FIG. 3B, a user's eyes 292 look towards object 302A at depth 312A. Gaze vectors 306A and 308A are determined, an intersection of the two gaze vectors is determined that indicates depth 312A, and the camera is driven to focus at depth 312A. If the user moves their gaze to look at object 202B at depth 212B, gaze vectors 306B and 308B are determined, an intersection of the two gaze vectors is determined that indicates depth 312B, and the camera is driven to focus at depth 312B.

This vergence-based method may work well in most cases, and does not depend on depth map information as does the depth-based method described in reference to FIGS. 2A and 2B. In addition, this method may not suffer from the ambiguities at or near the boundary of objects as does the depth-based method. However, the accuracy of this method at determining the precise depth of an object at which the user is looking may in some cases not be as high. In other words, the depth determined by the intersection of the left and right gaze vectors may be a bit off from the actual depth of the object, which may result in the object being somewhat out of focus.

Vergence/Depth Fusion Methods

Several embodiments that combine depth and vergence information to determine depth to drive autofocus of the camera are described that may overcome the limitations of the depth-based and vergence-based approaches described above. Depth-based focusing has high accuracy in determining depth but may introduce ambiguity as to what the user is trying to focus on. Vergence-based focusing provides a relatively stable signal for where/on what the user is trying to focus, but the focus depth is not always accurate. The embodiments described below combine the two signals to take advantage of the accuracy of depth-based focusing, as well as the ability of vergence to drive the focus to the right place in a scene.

Figure 4:
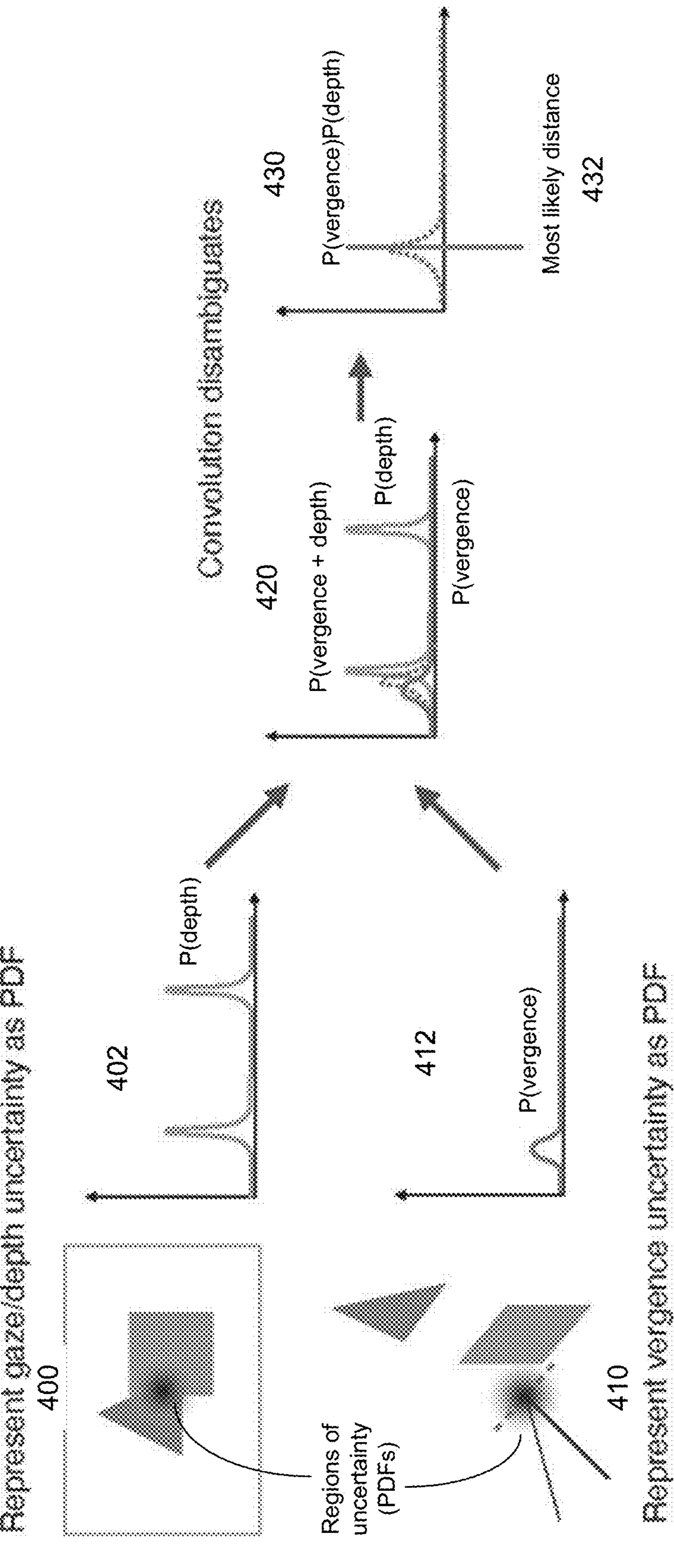
FIG. 4 illustrates a vergence-depth fusion method that uses a probabilistic framework to infer the focus distance, according to some embodiments.

FIG. 4 illustrates a vergence-depth fusion method that uses a probabilistic framework to infer the focus distance, according to some embodiments. Since both the gaze information and the depth information may be "noisy", treating one or both as certainties can lead to incorrect behavior, such as jumping back and forth between near focus and far focus at the edges of objects. In embodiments of a probabilistic framework method, depth is modeled as a distribution of possible answers of where an object is in a scene that a user might be looking at. Vergence is modeled as an uncertainty both in angular space and in distance. By formulating this as a probabilistic problem, these noisy estimates, distributions of possible answers, can be examined together to find a most likely answer.

In FIG. 4, in the top path (400 and 402), gaze and depth information may be represented as a probability density function (PDF). Element 400, the "cloud" (region of uncertainty) represents the fact that the gaze tracking algorithm may indicate that the gaze vector is landing right on edge of the square. There may be as much as several degrees of error. By modeling as an uncertainty cloud, the gaze/depth information covers at least portions of both the foreground object (the square) and the background object (the triangle). Looking at the distribution of depth (histogram 402), there may be two hypotheses for what object the user is looking at.

In FIG. 4, the bottom path (410 and 412) represents vergence. Independent of what is happening in the scene, there is uncertainty of where the user's eyes are actually verging. Vergence is modeled as an uncertainty both in angular space and in distance.

At 420 and 430, the two paths are combined to find a solution for the most likely distance (432). A Bayesian method (or some other method) may be used to estimate what is the most likely distance 432 the user is actually looking at. The depth information (top path) indicates that the user is either looking at either the square or the triangle. The vergence information (bottom path) indicates that the user is probably looking somewhere around the square, but exactly where is not known. The vergence information may thus function as a tie-breaker by lending credibility to the hypothesis that the user is looking at the square, and therefore that should be the solution and the distance 432 that is focused at.

Generally stated, in reference to FIG. 4, a formulation is provided where the noisy depth and vergence signals are fused to find the most likely distance 432 that the user is currently focusing on in the scene, and that distance 432 is used to drive the focus of the camera. Mathematically, this may be viewed as an estimation problem. There are two channels of information. Each channel has its own error models, and distribution of errors. This method fuses those two channels in an optimal way to improve the estimation of depth.

Figure 5A:
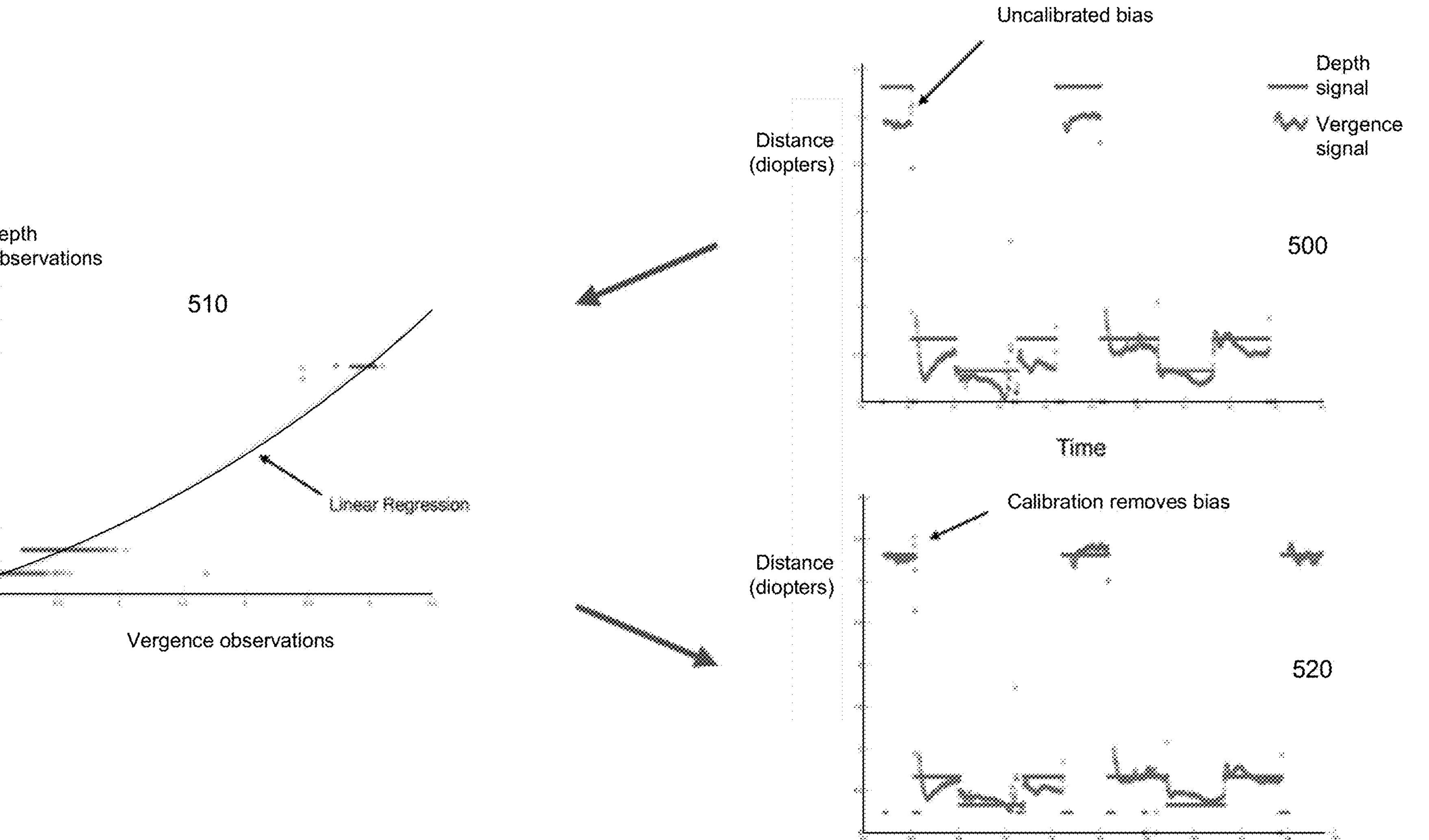
FIGS. 5A and 5B illustrate another vergence-depth fusion method that uses online or offline calibration of a vergence--depth model, according to some embodiments.
Figure 5B:
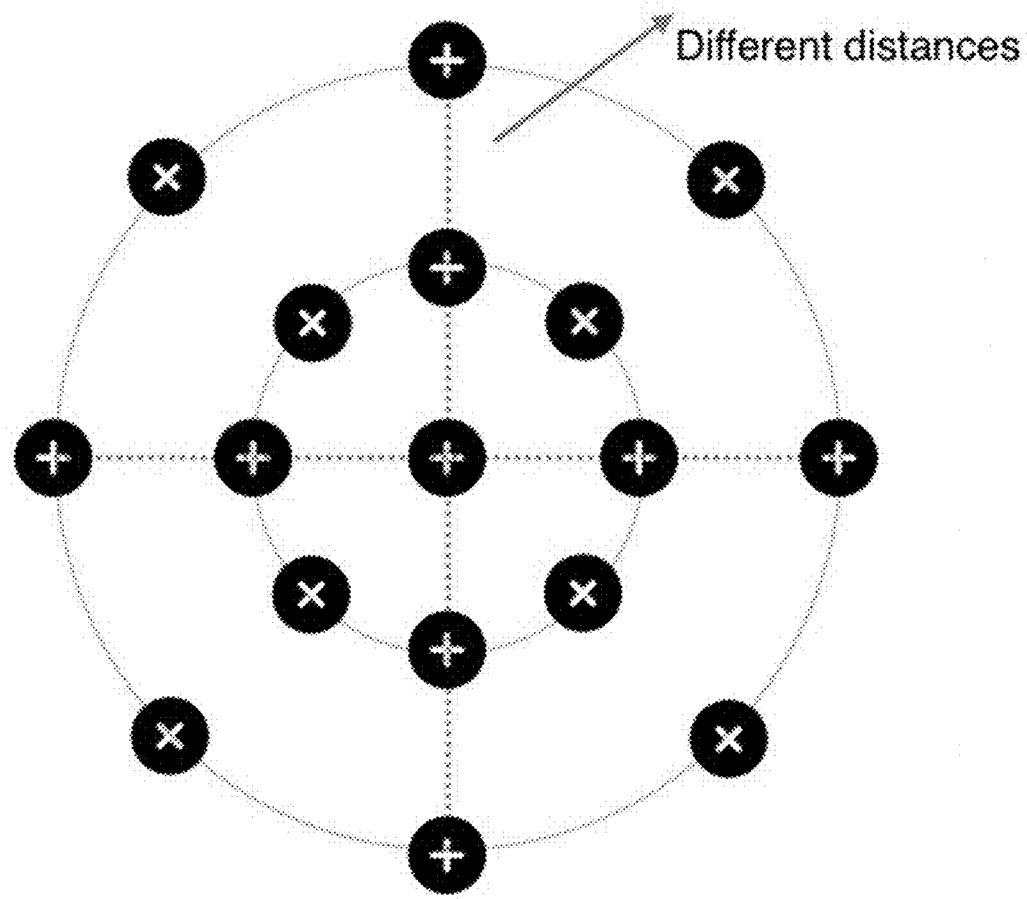

FIGS. 5A and 5B illustrate another vergence-depth fusion method that uses online or offline calibration of a vergence--depth model, according to some embodiments. This method collects depth observations (the generally straight lines) and vergence observations (the generally fuzzy or stochastic lines) (500) and performs a function on the combined observations (e.g., linear regression) to remove bias 510, to generate calibrated observations 520.

In FIG. 5A, the vergence observations show that the eyes are verging at some distance, but are tending to jump back and forth between a near and a far object, and perhaps something in between. Thus, these signals are noisy. The depth observations represent ground truth distances for where the objects are, how far away. There is bias in the signals, an error over time, where the vergence of the eyes is being measured at a wrong distance. Note that the objects may be real objects in the environment imaged by the camera, or virtual objects rendered and displayed on the display screen (e.g., a UI element, text, icon, or any virtual content).

These observations may be collected over time (500), and input to a linear regression optimizer (510) to obtain a model of how to map the vergence signal, to pull the vergence signal to the actual depth of the objects in a scene. Once the model, is applied, the bias is removed or reduced from the signals 520. The average vergence distance is much closer to the actual ground truth depth information across different distances in a scene, as shown at 520.

This method uses vergence as a primary signal for where to set the focus, but the vergence signal is calibrated against the ground truth of real distances in the scene to make the depth indicated by the vergence signal more accurate. Vergence is generally reliable and accurate when it can be trusted. When reliable, with good confidence, those observations may be used to train or calibrate the vergence signal. After calibration, the vergence signal may be both more reliable and accurate.

This calibration process may be done for each user of the device (e.g., an HMD) either offline (e.g., during an enrollment process) or online (when the user is actively using the device). (The linear regression curve shown in FIG. 5A is unique to each user, as vergence varies among users). In an example offline process, every time there is a new user of an HMD with gaze tracking, the user's eyes are "enrolled" to build a model of the eyes in relation to the "real world" and the device, to be used in gaze tracking. Conventionally, an angular enrollment is performed to determine the angle of gaze. By adding objects at different known distances to the enrollment process, vergence can be enrolled in addition to angular gaze.

The HMD may have depth sensing technology; however, in some situations the depth information may not be reliable. In situations where the depth information can be trusted, and where there is vergence information, observations of vergence together with depth can be recorded. Over time, a sufficient number of reliable observations can be recorded, and the linear regression model can be generated. The system may continually adaptively adjust the model over time as additional observations are recorded to ensure that the model correctly reflects what the user's vergence is doing. In other words, during normal use of the device, when high confidence situations are detected for the depth and vergence signals, those observations may be used as calibration points to improve the user's linear regression curve. In some embodiments, the system may include a confidence map for each depth map. The confidence map may be used to determine the confidence of a depth value, and thus objects that are the most reliable to get training data from may be determined.

FIG. 5B illustrates a vergence enrollment and initial calibration method that uses "targets" displayed to the user, according to some embodiments. In some embodiments, a vergence enrollment process may use simple virtual or real targets (e.g., ball-like targets), similar to what may be used in a conventional eye enrollment process. These targets may be placed at different XYZ or radial angle/azimuthal angle/distances. In some embodiments, a target is positioned at a known ground-truth position (XYZ) from a list of different XYZ or radial angle/azimuthal angle/distances. During enrollment, the user is asked to fixate on a target. The left/right gaze vectors are recorded, and the intersection point is computed and compared with the ground truth position. In various embodiments, regression/machine learning or a look-up table may be used to map computed vergence distance to calibrated vergence distance. In some embodiments, after an initial calibration, online calibration may be performed whenever there are reliable depths from real or virtual objects that the user is fixating on.

Figure 6:
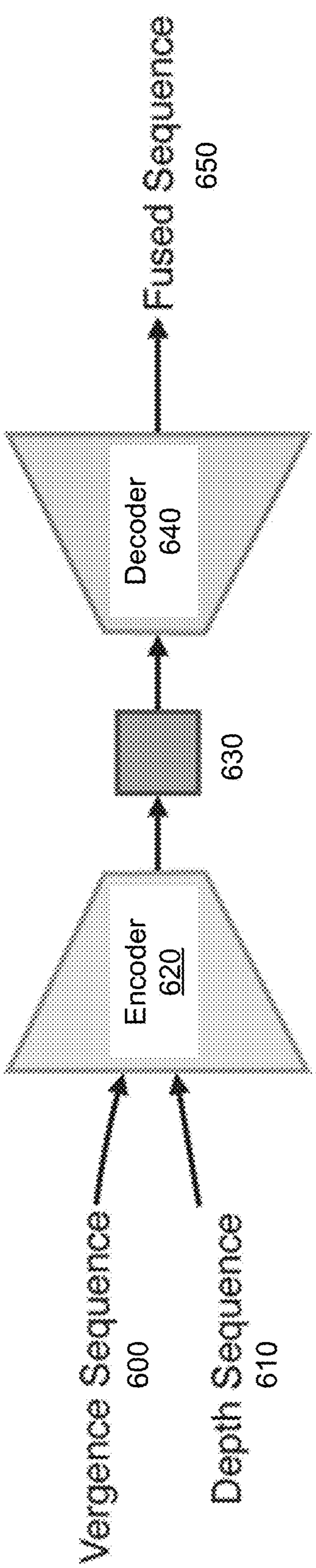
FIG. 6 illustrates another vergence--depth fusion method that uses a generative model, according to some embodiments.

FIG. 6 illustrates another vergence-depth fusion method that uses a generative model, according to some embodiments. In this method, a model may be trained to generate a fused camera focus distance sequence based on vergence and depth sequences. A network may be trained to take a sequence of vergence observations and depth observations and generate a fused sequence from the two input sequences.

At a high level, this method uses machine learning to solve the problem. A model may be trained on vergence and depth information, and after training camera focus distances can be output for input vergence and depth inputs. As shown in FIG. 6, a vergence sequence 600 and depth sequence 610 are input to an encoder 620 function that trains a model 630. A decoder 640 function outputs a fused sequence 650.

Closed-Loop Focusing Using Vergence Information

Figures 7A, 7B:
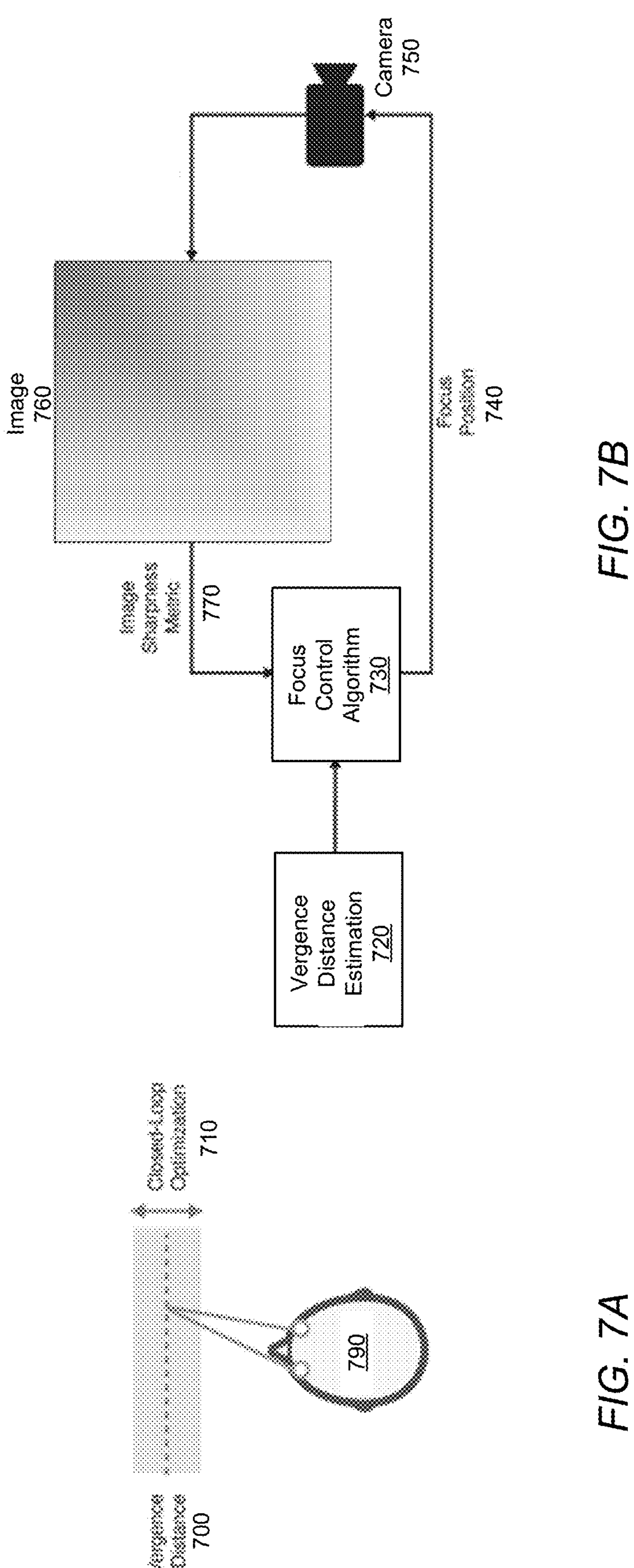
FIGS. 7A and 7B illustrate vergence and closed-loop focus hybrid methods, according to some embodiments.

FIGS. 7A and 7B illustrate vergence and closed-loop focus hybrid methods, according to some embodiments. In these methods, vergence distance gets close to a target and defines a focus position optimization range. Closed-loop feedback may then be applied between the focus position and an image sharpness metric to refine the result. FIG. 7A graphically illustrates a vergence distance 700 for a user 790, and a range of focus distances 710 in which the distance is to be optimized. FIG. 7B shows the closed-loop optimization method. A vergence distance is estimated 720 and input into a focus control algorithm 730. A focus position 740 based on the input from 720 is used to drive the camera 750 to the focus distance. An image 760 is captured, and an image sharpness metric 770 is derived from the image 760. The image sharpness metric 770 is fed back to the focus control algorithm 730, which adjusts the focus position 740 as necessary and uses the new focus position 740 to drive the camera 750 focus distance. This feedback loop may continue until the image sharpness metric 770 is optimized.

This method performs automatic focusing without fusing the depth and vergence information as is done in FIGS. 4 through 6. Vergence is used to determine roughly where focus, and some metric in image space (e.g., an image sharpness metric) can be leveraged to indicate how sharp the object appears. This is performed in a closed loop, making small adjustments to the focus position, to drive the camera to an optimal focus distance. Conventional autofocus may have a region of interest, and attempt to optimize sharpness or contrast in that region. A difference from conventional autofocus in this method is that the method knows roughly the solution based on vergence, and constrains how much the actuator is moved so that the actuator is not driven to a totally different position to focus on a significantly different object distance. The optimization is "primed" with the vergence distance as a starting point for finding the correct focus distance. The "last mile" of focusing is performed in a closed loop, with an image metric used to optimize the focusing within a narrow range.

Any of several image metrics 770, or combinations thereof, may be used in the feedback loop. In some embodiments, the feedback metric 770 could be a conventional autofocus (AF) metric, but limited to optimize within a range determined from the vergence signal.

Figure 7C:
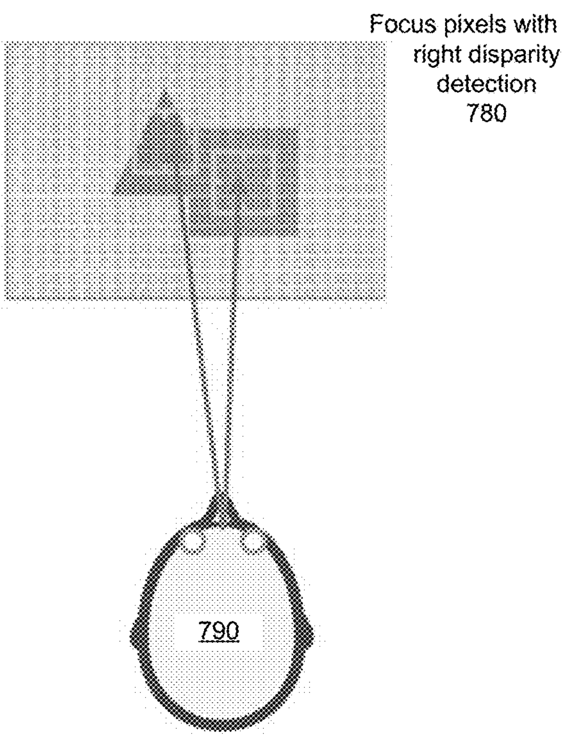
FIGS. 7C and 7D illustrate a method that uses focus pixels to focus on an object indicated by a gaze vector, according to some embodiments.
Figure 7D:
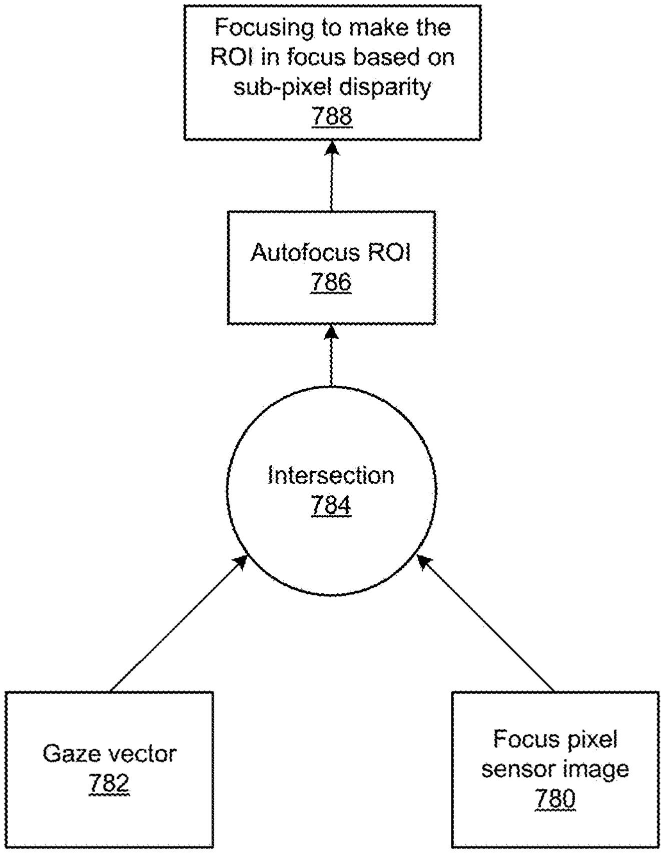

FIGS. 7C and 7D illustrate a method in which focus pixels are used to determine whether a region the user is fixating on is in focus, and in which camera focusing is adjusted to make the camera in focus depending on a sign of disparity in focus pixel(s), according to some embodiments. This method may, for example, be used to perform the "last mile" focusing described in reference to FIGS. 7A and 7B. Autofocus sensors are mature technology. In this technology, the sensor has a pixel structure, for example left/right sub-pixels, that can detect if a region in the image is in focus or not by detecting whether there is disparity between left/right sub-pixels. This method is similar to a conventional tap-to-focus method used in smartphones and tablets, but the tap is replaced with gaze (the gaze vector) to determine where in the image the camera is to focus. FIG. 7C illustrates a user 790 looking at an image that includes focus pixels with left/right parity disparity detection. As shown in FIG. 7D, the intersection of a gaze vector 782 with a focus pixel sensor image 780 is used to determine an autofocus region of interest (ROI) 786. At 788, a focusing method is applied (for example, the closed-loop method of FIG. 7B) to make the ROI in focus based on sub-pixel left/right disparity.

Embodiments of the methods as illustrated in FIGS. 7A through 7D may be used with any of the methods described in reference to FIGS. 2A through 8 to do "last mile" focusing once a starting focus position has been determined according to the respective method.

Manual Focusing Methods

Figure 8:
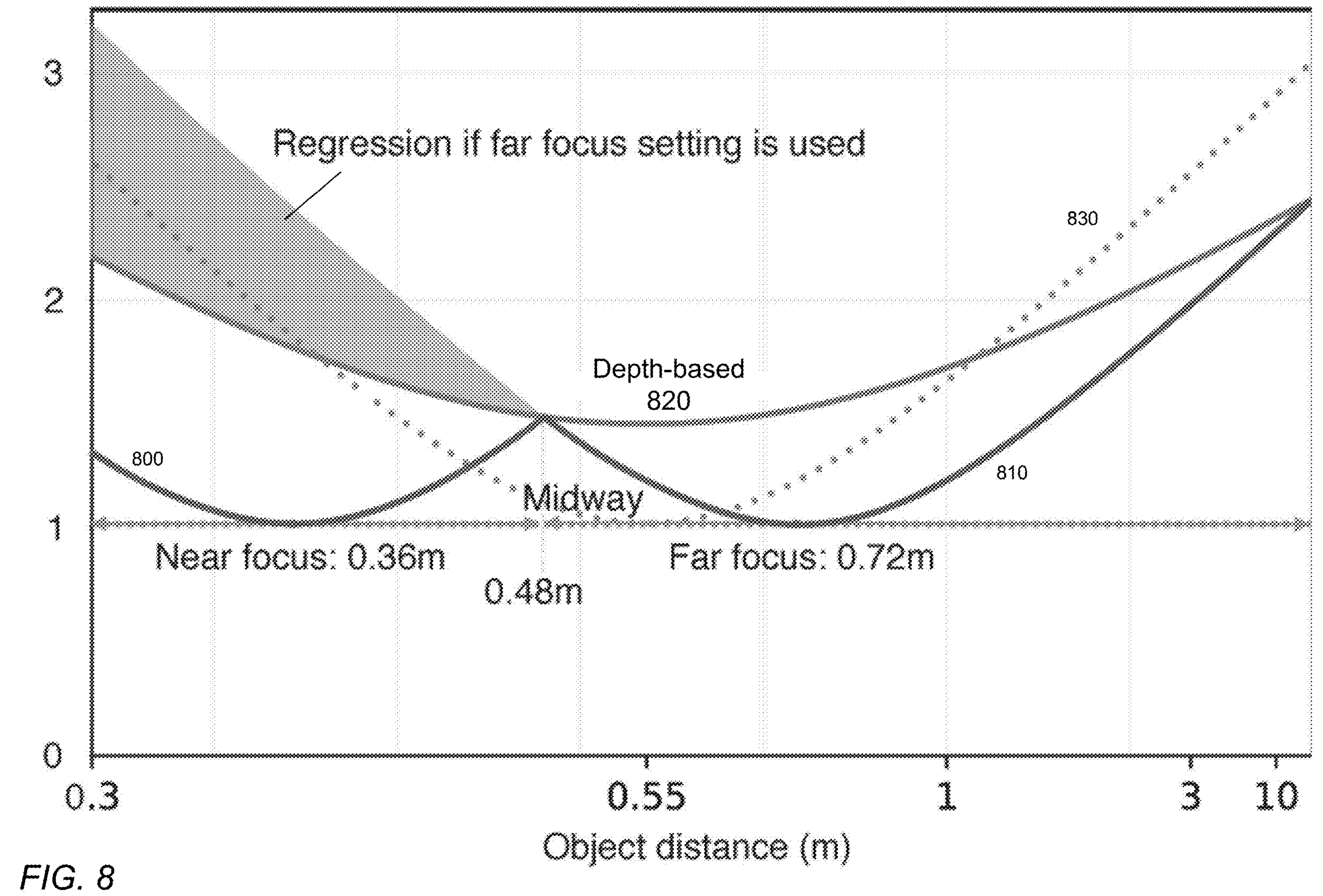
FIG. 8 illustrates a manual bifocal focusing method, according to some embodiments.

FIG. 8 illustrates a manual bifocal focusing method, according to some embodiments. For certain users or a certain segment of the population, the gaze-driven focusing techniques described above may not work well, for example due to the physiology of the users' eyes. As an alternative, embodiments are also described in which the user can manually control the focus distance. For example, a manual bifocal method is described that may provide two focus distances (near focus and far focus), similar to conventional bifocal lenses in glasses.

Embodiments of the method described in reference to FIG. 8 may provide a way to deliver the benefits of having a focusable camera to users who choose not to use continuous automatic focusing as described in reference to FIGS. 2A through 7, or to users for which the continuous focusing methods do not work, for example due to the physiology of the users' eyes. As an example, some portion of the population may have eyes for which the vergence does not closely correspond to the depth at which they want to focus. Embodiments may provide a manual method to control the focus distance of the camera to suit particular users' needs or preferences; the method may provide two predetermined focus distances (near focus and far focus), rather than the continuous focus distances as previously described. In some embodiments, the user may select between the two focus modes, for example using a control of or on the HMD or by performing a gesture with the hands or eyes to switch modes.

Note that in some embodiments, the method may be configured to automatically switch between the two preconfigured focus distances based on a detected condition, for example detecting the user looking downwards through the lenses of the HMD rather than straight ahead may be used to automatically switch to near focus mode rather than far focus mode, or the detection of an object intersected by the user's gaze vector that is within a certain minimum distance may be used to automatically switch to near focus mode.

Referring to FIG. 8, curve 830 represents the conventional fixed-focus technique. Curve 820 corresponds to focus using a depth-based technique. Curves 810 and 800 represent splitting the focus into two portions, near and far. Curve 810 corresponds to a far focus mode, in this example set to approximately 0.7 m. Curve 800 corresponds to a near focus mode, in this example set to approximately 0.4 m. For any object approximately 0.5 m or farther from the camera, the far focus setting is use. For closer objects, the device may toggle the camera to the near focus setting. By carefully choosing the two values, the whole range can be effectively covered while providing satisfactory sharpness.

Using these methods, users may be given control of the focus distance, with no ambiguity as may be present in the other methods described herein, while allowing the user to focus on near objects that may not be feasible using a conventional fixed-focus technique. This method does not suffer from errors in gaze, vergence, and depth maps that may be present in the other methods described herein, and do not depend on the camera sensor to determine focus distance.

However, these methods may place the burden on the user to manually select the focus distance, rather than providing continuous, automatic focusing as in the other methods described herein. If the user does not select the correct setting, sharpness will be poor, for example as illustrated by the region of regression if the far focus setting is used for close objects as illustrated in FIG. 8.

Conventional fixed-focused methods may be viewed as single-plane method. The method of FIG. 8 may be viewed as a dual-plane method. The automatic methods described in reference to FIGS. 2A through 7 are continuous, many-plane methods. While embodiments are described as dual-plane methods as shown in FIG. 8, a multiple fixed-plane method may be used, such as a trifocal method similar to FIG. 8, but with another, intermediate mode.

In some embodiments, an HMD may support one or more of the continuous focus methods as illustrated in reference to FIGS. 2A through 7, and may also support the bifocal focus method as illustrated in reference to FIG. 8. A control or setting for the HMD may be used to select the particular focus method that the user wants to use. Thus, a user who does not want to, or that cannot successfully, use one of the continuous focus modes may choose to switch the HMD into bifocal focus mode. In addition, there may be certain conditions, such as low light conditions, where one of the continuous, automatic focusing methods does not work well; a user may choose to switch to bifocal focusing in those conditions, even if the continuous focusing method normally works well for them. In some embodiments, the device may automatically switch between a continuous focusing mode and a bifocal mode upon detecting certain such conditions.

Flowcharts

Figure 9:
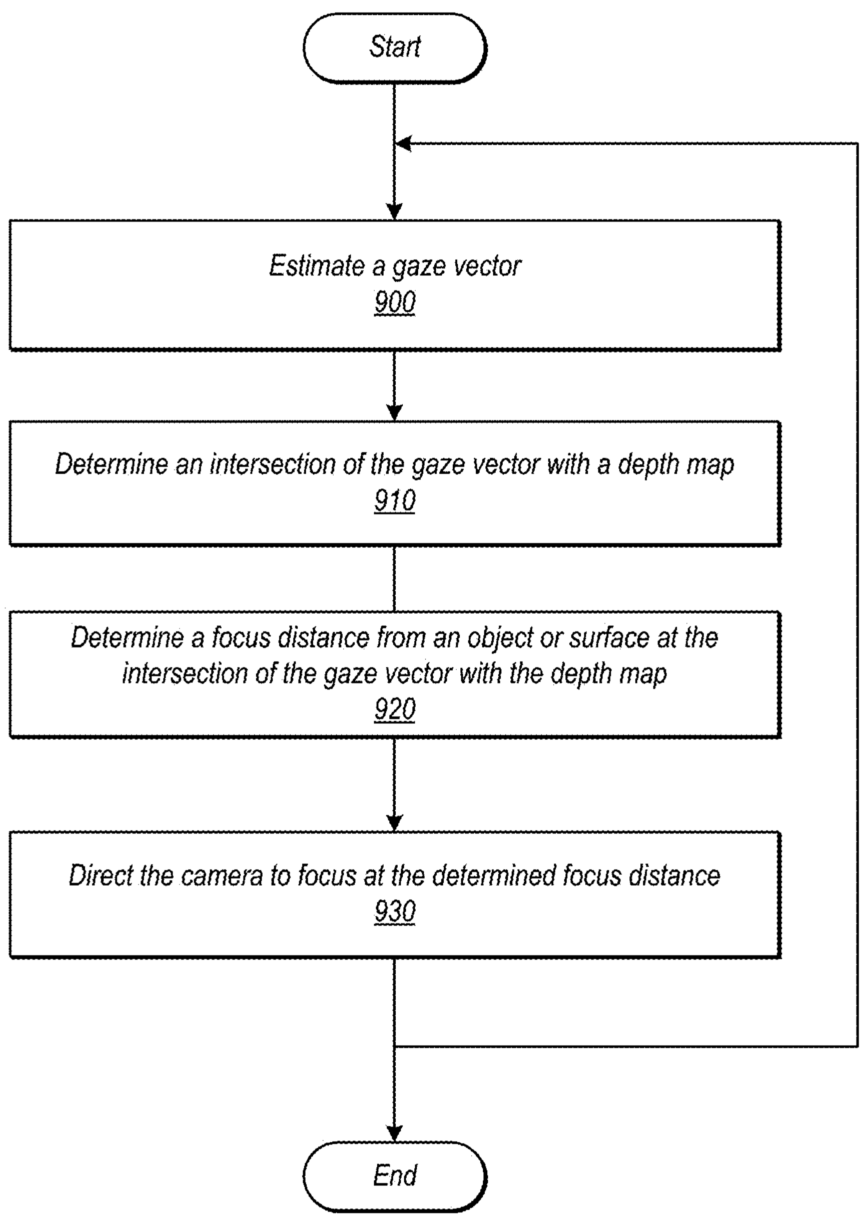
FIG. 9 is a high-level flowchart of a depth-based focus method, according to some embodiments, according to some embodiments.

FIG. 9 is a high-level flowchart of a depth-based focus method, according to some embodiments, according to some embodiments. The method of FIG. 9 corresponds to the method shown in FIGS. 2A-2B. As indicated at 900, a gaze vector may be estimated by a gaze tracking subsystem or gaze tracker. As indicated at 910, an intersection of the gaze vector with a depth map may be determined. As indicated at 920, a focus distance may be determined from an object or surface at the intersection of the gaze vector with the depth map. As indicated at 930, the camera may be directed to focus at the determined focus distance. As indicated by the arrow returning from 930 to 900, the method may continue as long as the device is being used.

Figure 10:
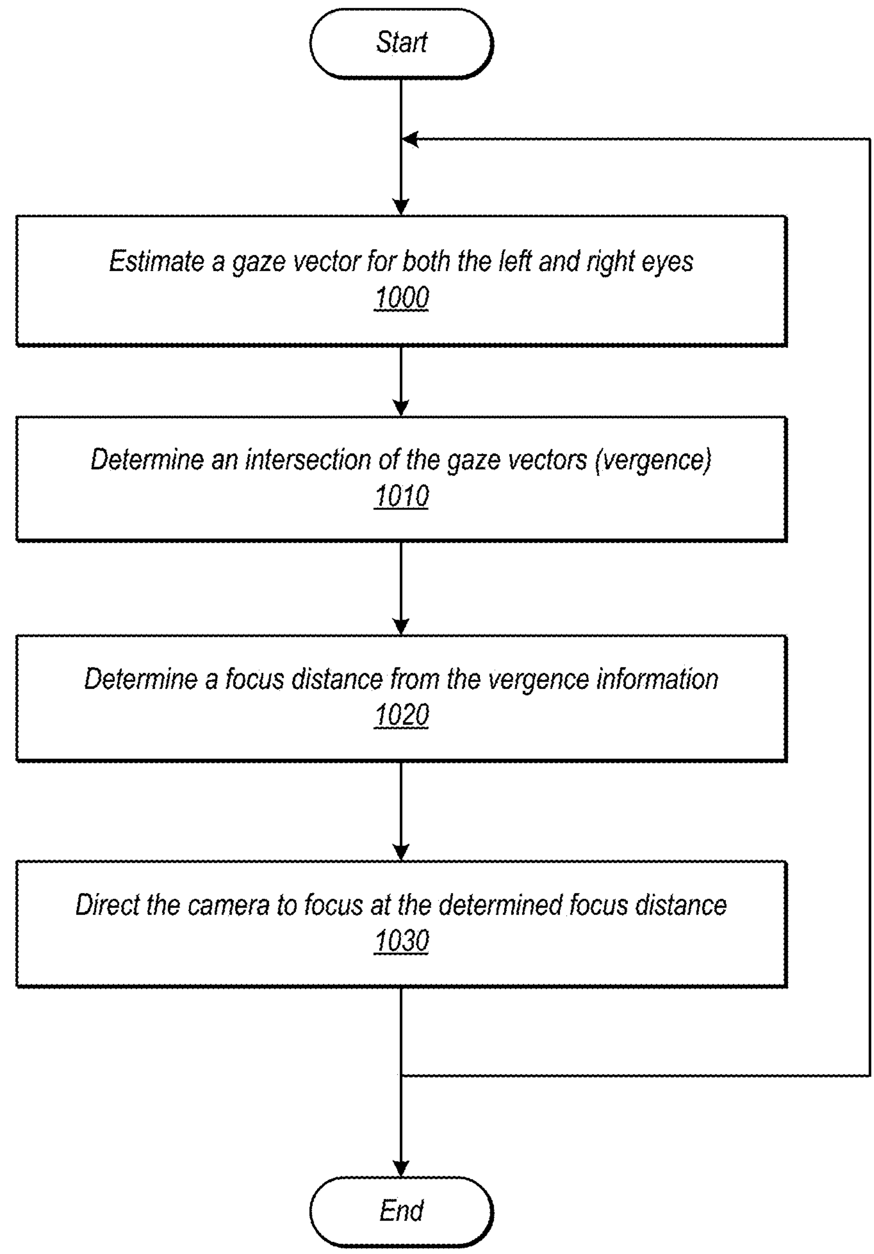
FIG. 10 is a high-level flowchart of a vergence-based focus method, according to some embodiments.

FIG. 10 is a high-level flowchart of a vergence-based focus method, according to some embodiments. The method of FIG. 10 corresponds to the method shown in FIGS. 3A-3B. As indicated at 1000, gaze vectors may be determined for both the left and right eyes by a gaze tracking subsystem or gaze tracker. As indicated at 1010, vergence (an intersection of the gaze vectors in 3D space) may be determined. As indicated at 1020, a focus distance may be determined from the vergence information. As indicated at 1030, the camera may be directed to focus at the determined focus distance. As indicated by the arrow returning from 1030 to 1000, the method may continue as long as the device is being used.

Figure 11:
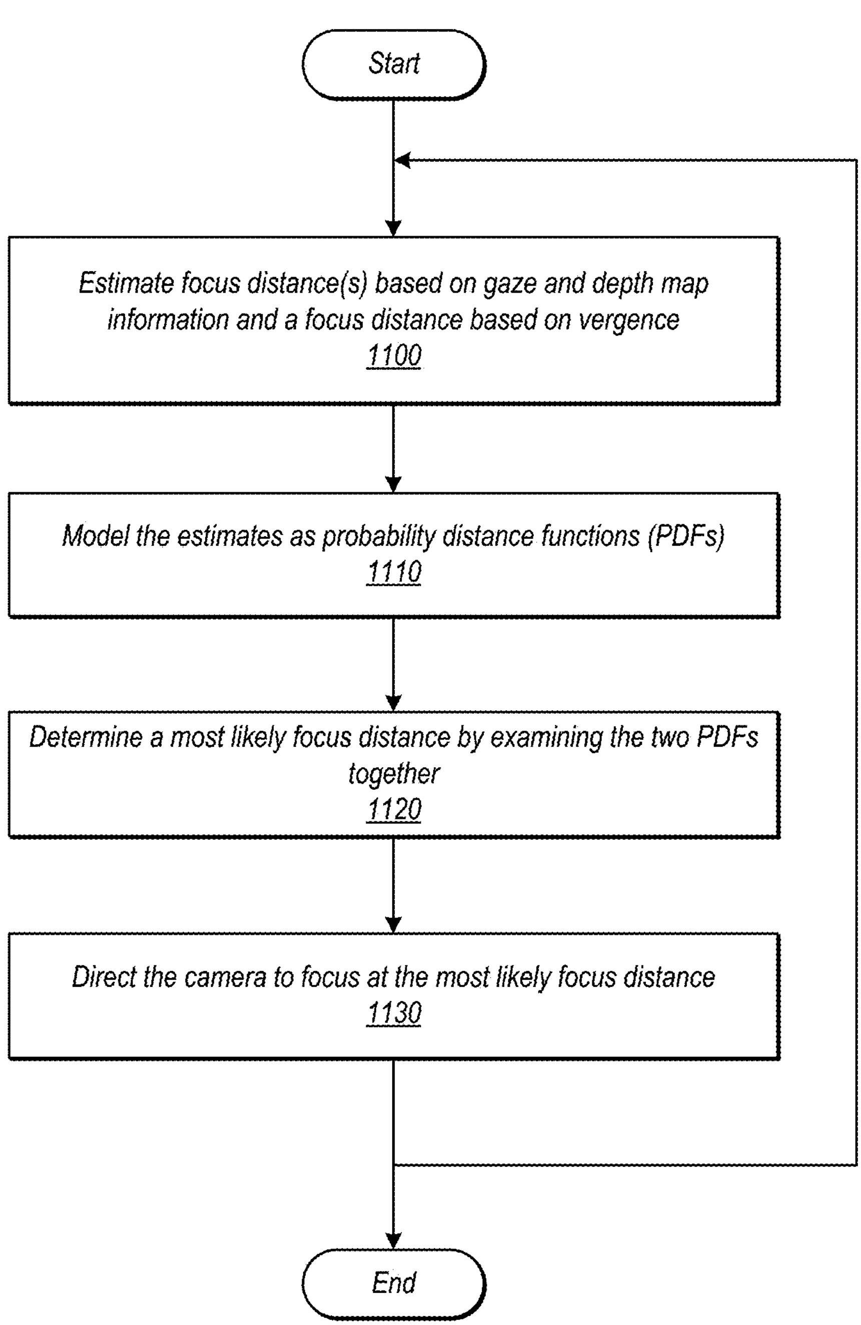
FIG. 11 is a high-level flowchart of a vergence-depth fusion method that uses a probabilistic framework to infer the focus distance, according to some embodiments.

FIG. 11 is a high-level flowchart of a vergence-depth fusion method that uses a probabilistic framework to infer the focus distance, according to some embodiments. The method of FIG. 11 corresponds to the method shown in FIG. 4. As indicated at 1100, focus distance(s) may be estimated based on gaze and depth map information, and a focus distance may also be estimated based on vergence. As indicated at 1110, the two estimates of focal distances may be modeled as probability distance functions (PDFs). As indicated at 1120, a most likely focus distance may be determined by examining the two PDFs together. As indicated at 1130, the camera may be directed to focus at the most likely focus distance. As indicated by the arrow returning from 1130 to 1100, the method may continue as long as the device is being used.

Figure 12:
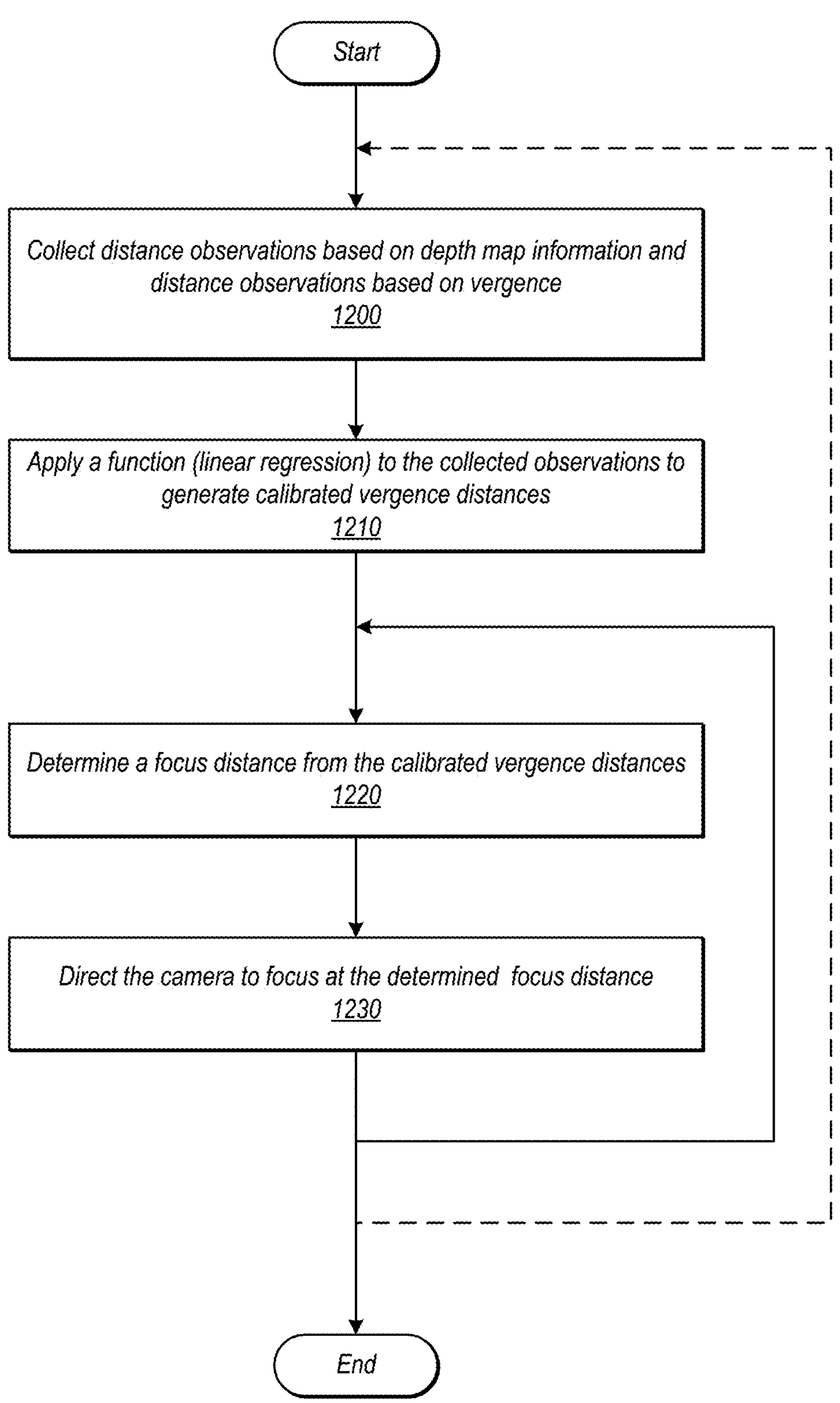
FIG. 12 is a high-level flowchart of another vergence-depth fusion method that uses online or offline calibration of a vergence--depth model, according to some embodiments.

FIG. 12 is a high-level flowchart of another vergence-depth fusion method that uses online or offline calibration of a vergence--depth model, according to some embodiments. The method of FIG. 12 corresponds to the method shown in FIG. 5. As indicated at 1200, distance observations based on depth map information and distance observations based on vergence are collected over time. The distance observations may be collected for real objects in the environment that are captured by the camera, and/or for virtual objects that are rendered and displayed on the display screen. As indicated at 1210, a function (e.g., linear regression) may be applied to the collected observations to generate calibrated vergence distances. As indicated at 1220, a focus distance may be determined from the calibrated vergence distances, for example by receiving a vergence estimate and adjusting the estimate to a corresponding calibrated vergence distance. As indicated at 1230, the camera may be directed to focus at the determined focus distance. As indicated by the arrow returning from 1230 to 1200, the method may continue as long as the device is being used. As indicated by the dashed arrow returning from 1230 to 1200, the calibration process may be performed during use of the device, or a previous calibration may be updated with new information during use of the device. In some embodiments, and initial calibration of vergence distances (1200-1210) may be performed during an enrollment process for a user of the device.

In some embodiments, as an alternative to the method shown in FIG. 12, a vergence enrollment process may use simple virtual or real targets (e.g., ball-like targets), similar to what may be used in a conventional eye enrollment process. These targets may be placed at different XYZ or radial angle/azimuthal angle/distances. In some embodiments, a target is positioned at a known ground-truth position (XYZ) from a list of different XYZ or radial angle/azimuthal angle/distances. During enrollment, the user is asked to fixate on a target. The left/right gaze vectors are recorded, and the intersection point is computed and compared with the ground truth position. In various embodiments, regression/machine learning or a look-up table may be used to map computed vergence distance to calibrated vergence distance. In some embodiments, after an initial calibration, online calibration may be performed whenever there are reliable depths from real or virtual objects that the user is fixating on.

Figure 13:
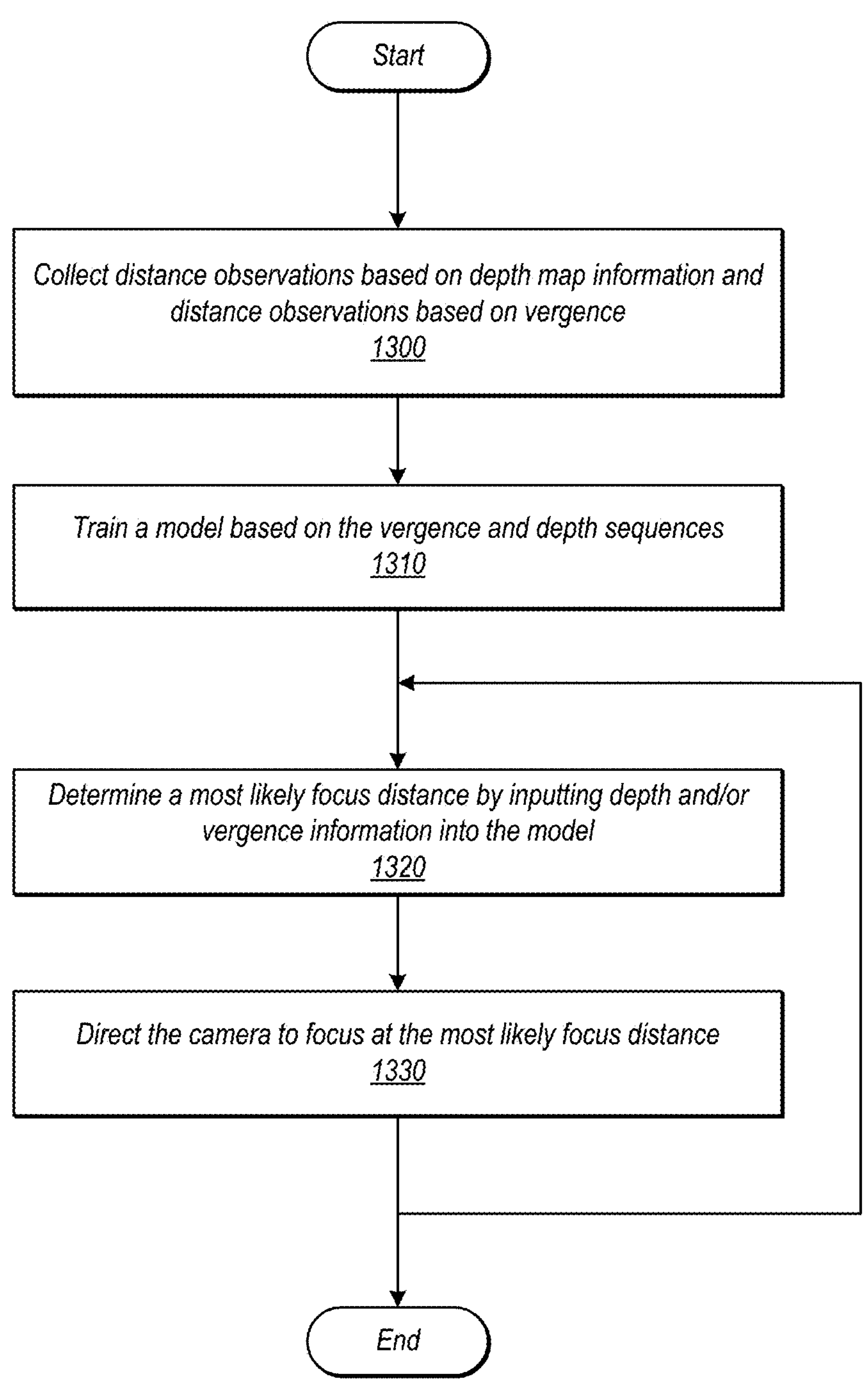
FIG. 13 is a high-level flowchart of another vergence--depth fusion method that uses a generative model, according to some embodiments.

FIG. 13 is a high-level flowchart of another vergence--depth fusion method that uses a generative model, according to some embodiments. The method of FIG. 13 corresponds to the method shown in FIG. 6. In this method, a model may be trained to generate a fused camera focus distance sequence based on vergence and depth sequences. A network may be trained to take a sequence of vergence observations and depth observations and generate a fused sequence from the two input sequences. As indicated at 1300, distance observations based on depth map information and distance observations based on vergence may be collected. As indicated at 1310, a model may be trained based on the vergence and depth sequences. As indicated at 1320, during use of the device, a most likely focus distance may be determined by inputting depth and/or vergence information into the model. As indicated at 1330, the camera may be directed to focus at the determined focus distance. As indicated by the arrow returning from 1330 to 1320, the method may continue as long as the device is being used. Note that the model may be updated by new observations made during use to thus improve the model. An initial model may be generated during enrollment of a user on the device.

Figure 14:
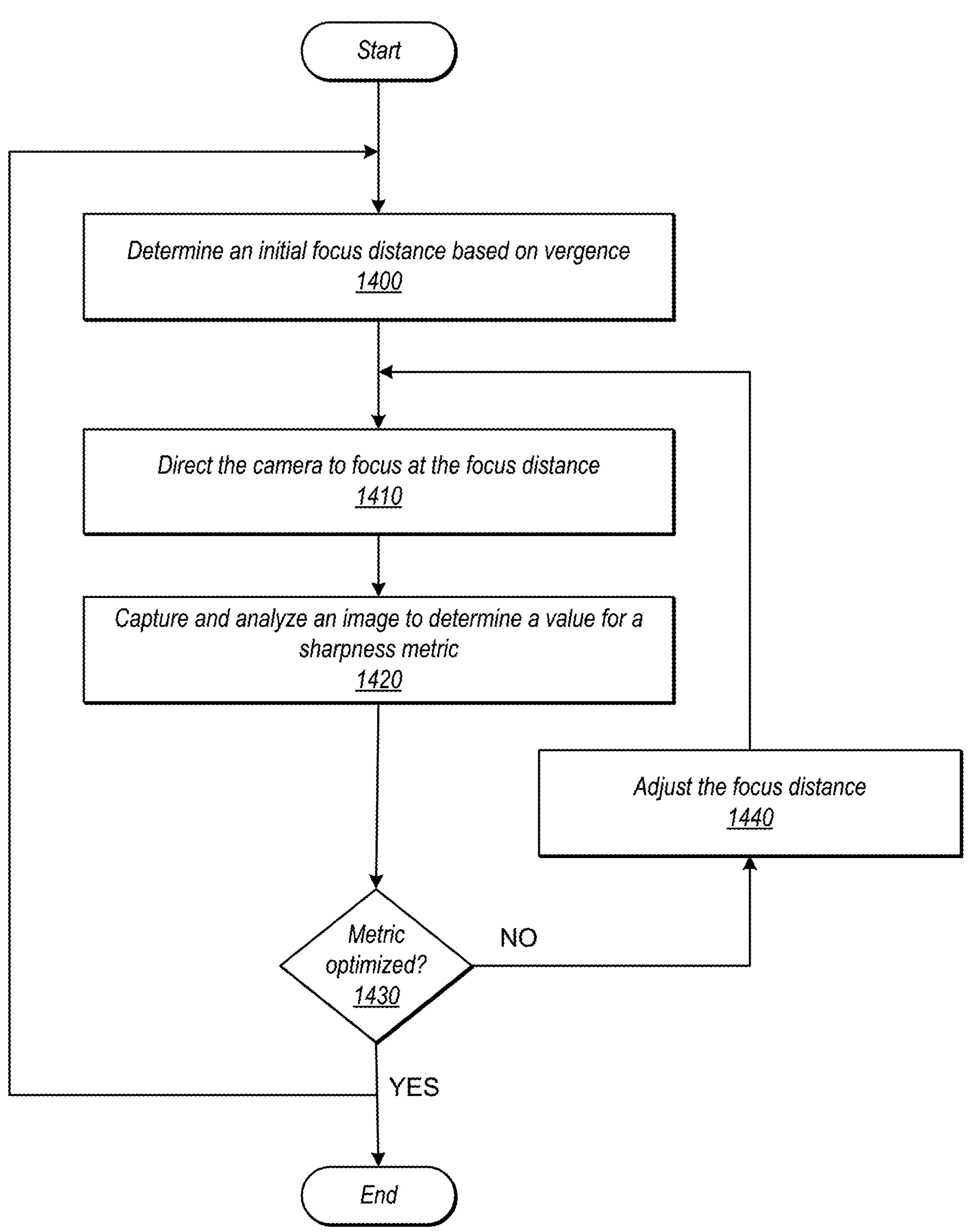
FIG. 14 is a high-level flowchart of a vergence and closed-loop focus hybrid method, according to some embodiments.

FIG. 14 is a high-level flowchart of a vergence and closed-loop focus hybrid method, according to some embodiments. The method of FIG. 14 corresponds to the method shown in FIGS. 7A-7B. In this method, vergence distance gets close to a target and defines a focus position optimization range. Closed-loop feedback may then be applied between the focus position and an image sharpness metric to refine the result. As indicated at 1400, an initial focus distance may be determined based on vergence. As indicated at 1410, the camera may be directed to focus at the focus distance. As indicated at 1420, an image may be captured by the camera at the focus distance, and analyzed to determine a value for a sharpness metric. At 1430, in the sharpness metric has been optimized (e.g., is within a specified acceptable range), the closed-loop focusing is done. At 1430, if the metric has not been optimized, the focus distance may be adjusted (at least in part based on the value of the sharpness metric), and the method returns to 1410 to capture and analyze another image at the new focus distance. Elements 1410-1440 may be repeated in a "closed loop" until the test at element 1430 is satisfied. As indicated by the arrow returning from 1430 to 1400, the entire method may be continued as long as the device is in use.

In some embodiments, focus pixels are used to determine whether a region the user is fixating on is in focus, and in which camera focusing is adjusted to make the camera in focus depending on a sign of disparity in focus pixel(s), as shown in FIGS. 7C and 7D. This method may, for example, be used to perform the "last mile" focusing described in reference to FIG. 14. In this method, the sensor has a pixel structure, for example left/right sub-pixels, that can detect if a region in the image is in focus or not by detecting whether there is disparity between left/right sub-pixels. In this method, the intersection of a gaze vector with a focus pixel sensor image is used to determine an autofocus region of interest (ROI). At A focusing method is applied (for example, the closed-loop method of FIG. 14) to make the ROI in focus based on sub-pixel left/right disparity.

Figure 15:
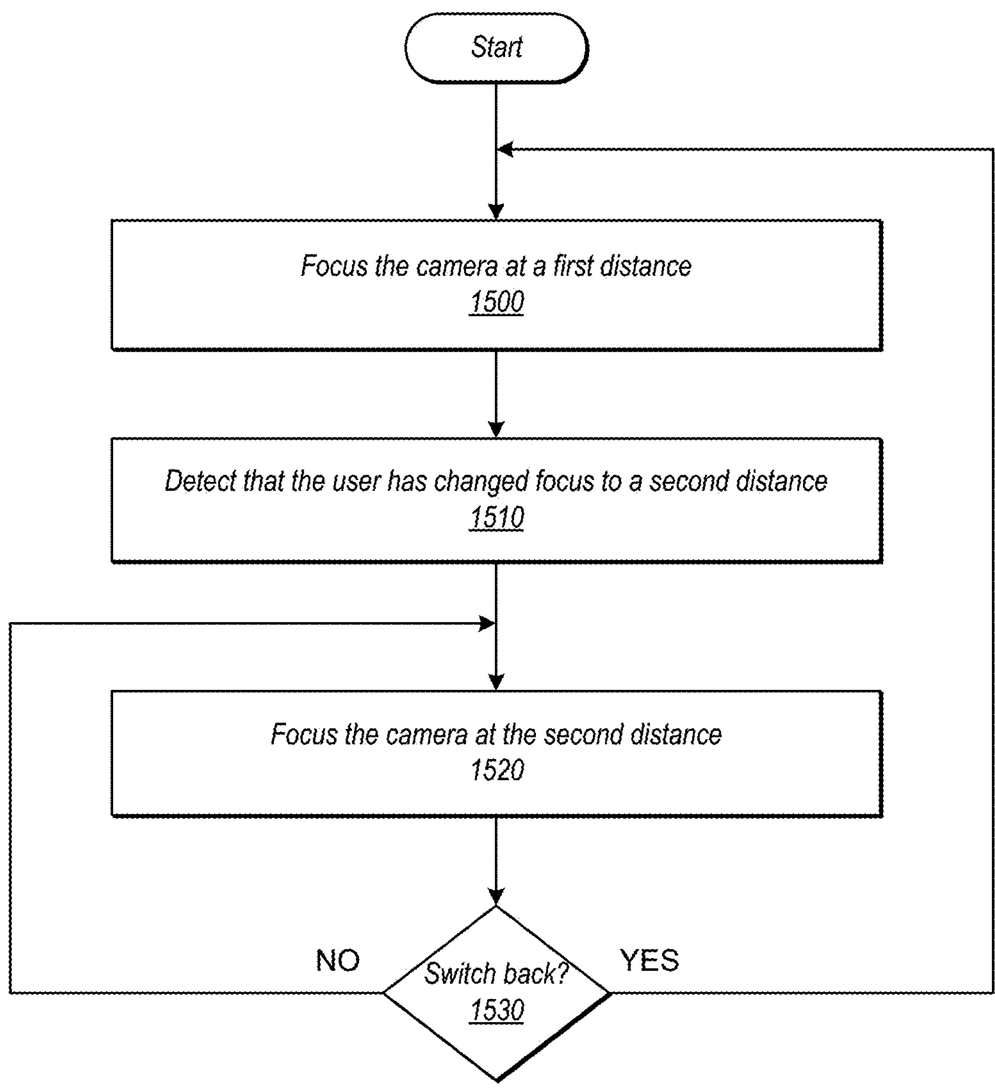
FIG. 15 is a high-level flowchart of a manual bifocal focusing method, according to some embodiments.

FIG. 15 is a high-level flowchart of a manual bifocal method, according to some embodiments. The method of FIG. 15 corresponds to the method shown in FIG. 8. For certain users or a certain segment of the population, the gaze-driven focusing techniques described above may not work well, for example due to the physiology of the users' eyes. As an alternative, in some embodiments, the user can manually control the focus distance. For example, a manual bifocal method may be implemented that may provide two focus distances (near focus and far focus), similar to conventional bifocal lenses in glasses. As indicated at 1500, the system may focus the camera at a first distance (for example far focus as illustrated in FIG. 8). As indicated at 1510, the system may detect that the user has changed (or wants to change) focus to a second distance (for example near focus as illustrated in FIG. 8). The device may then switch the camera focus to the second distance. As indicated at 1530, focus may remain at this distance until detecting that the user has changed (or wants to change) back to the first distance.

In some embodiments, the user may select between the two focus modes or distances, for example using a control of or on the HMD or by performing a gesture with the hands or eyes to switch modes. In some embodiments, the method may be configured to automatically switch between the two preconfigured focus distances based on a detected condition, for example detecting the user looking downwards through the lenses of the HMD rather than straight ahead may be used to automatically switch to near focus mode rather than far focus mode, or the detection of an object intersected by the user's gaze vector that is within a certain minimum distance may be used to automatically switch to near focus mode.

The far focus mode may, for example be set to approximately 0.7 m. The near focus mode may, for example, be set to approximately 0.4 m. For any object approximately 0.5 m or farther from the camera, the far focus setting may be use. For closer objects, the device may toggle the camera to the near focus setting. By carefully choosing the two values, the whole range can be effectively covered while providing satisfactory sharpness.

Figure 16A:
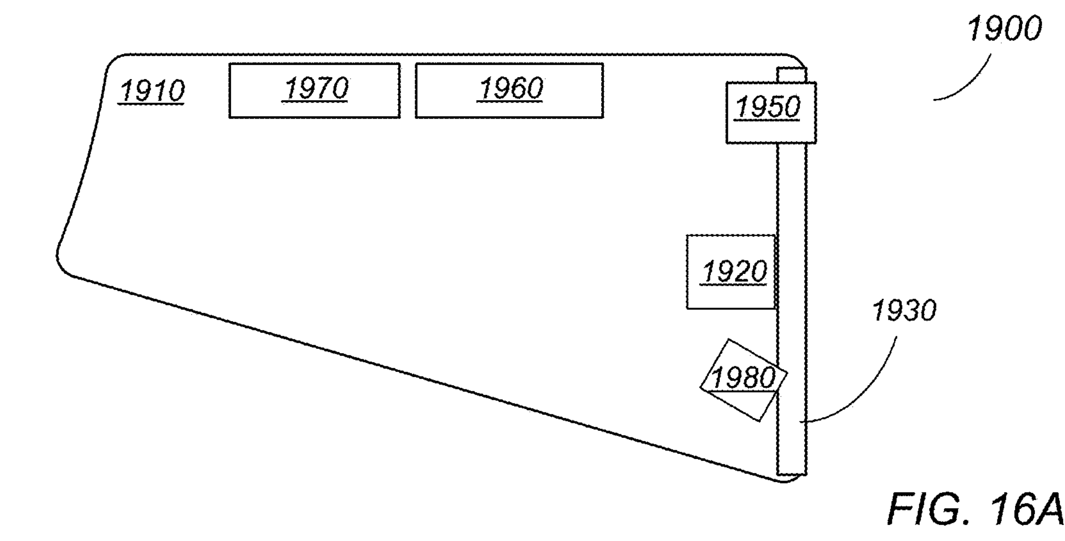
FIGS. 16A through 16C illustrate example devices in which the methods of FIGS. 1 through 15 may be implemented, according to some embodiments.
Figure 16B:
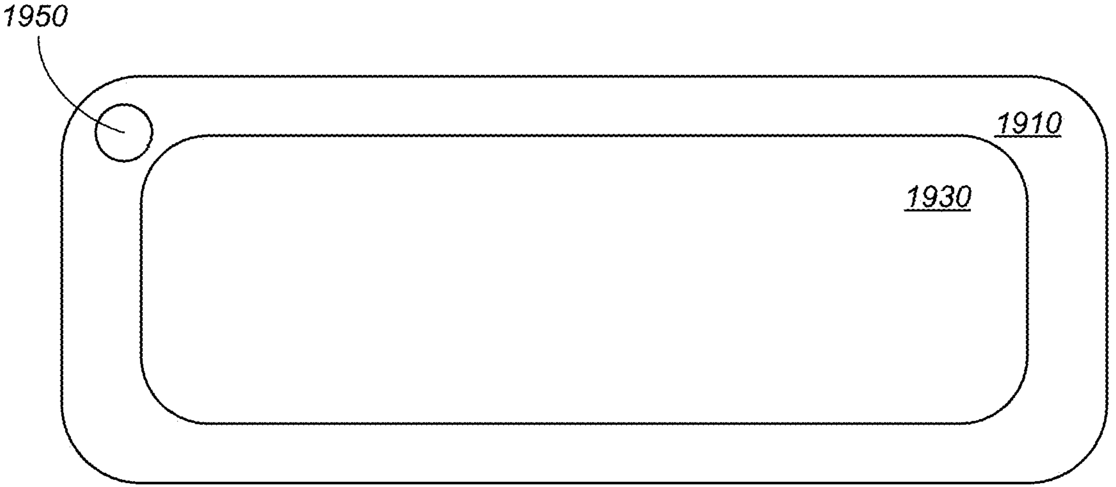
Figure 16C:
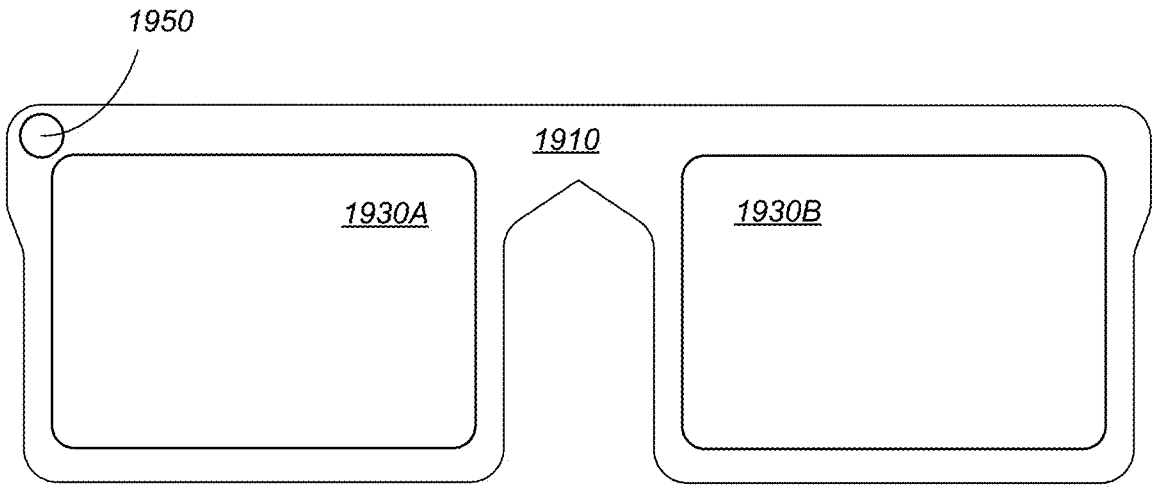

FIGS. 16A through 16C illustrate example devices in which the methods of FIGS. 1 through 15 may be implemented, according to some embodiments. Note that the HMDs 1900 as illustrated in FIGS. 16A through 16C are given by way of example, and are not intended to be limiting. In various embodiments, the shape, size, and other features of an HMD 1900 may differ, and the locations, numbers, types, and other features of the components of an HMD 1900 and of the eye imaging system. FIG. 16A shows a side view of an example HMD 1900, and FIGS. 16B and 16C show alternative front views of example HMDs 1900, with FIG. 16A showing device that has one lens 1930 that covers both eyes and FIG. 16B showing a device that has right 1930A and left 1930B lenses.

HMD 1900 may include lens(es) 1930, mounted in a wearable housing or frame 1910. HMD 1900 may be worn on a user's head (the "wearer") so that the lens(es) is disposed in front of the wearer's eyes. In some embodiments, an HMD 1900 may implement any of various types of display technologies or display systems. For example, HMD 1900 may include a display system that directs light that forms images (virtual content) through one or more layers of waveguides in the lens(es) 1920; output couplers of the waveguides (e.g., relief gratings or volume holography) may output the light towards the wearer to form images at or near the wearer's eyes. As another example, HMD 1900 may include a direct retinal projector system that directs light towards reflective components of the lens(es); the reflective lens(es) is configured to redirect the light to form images at the wearer's eyes.

In some embodiments, HMD 1900 may also include one or more sensors that collect information about the wearer's environment (video, depth information, lighting information, etc.) and about the wearer (e.g., eye or gaze tracking sensors). The sensors may include one or more of, but are not limited to one or more eye tracking cameras 1920 (e.g., infrared (IR) cameras) that capture views of the user's eyes, one or more world-facing or PoV cameras 1950 (e.g., RGB video cameras) that can capture images or video of the real-world environment in a field of view in front of the user, and one or more ambient light sensors that capture lighting information for the environment. Cameras 1920 and 1950 may be integrated in or attached to the frame 1910. HMD 1900 may also include one or more light sources 1980 such as LED or infrared point light sources that emit light (e.g., light in the IR portion of the spectrum) towards the user's eye or eyes.

A controller 1960 for the XR system may be implemented in the HMD 1900, or alternatively may be implemented at least in part by an external device (e.g., a computing system or handheld device) that is communicatively coupled to HMD 1900 via a wired or wireless interface. Controller 1960 may include one or more of various types of processors, image signal processors (ISPs), graphics processing units (GPUs), coder/decoders (codecs), system on a chip (SOC), CPUs, and/or other components for processing and rendering video and/or images. In some embodiments, controller 1960 may render frames (each frame including a left and right image) that include virtual content based at least in part on inputs obtained from the sensors and from an eye tracking system, and may provide the frames to the display system.

Memory 1970 for the XR system may be implemented in the HMD 1900, or alternatively may be implemented at least in part by an external device (e.g., a computing system) that is communicatively coupled to HMD 1900 via a wired or wireless interface. The memory 1970 may, for example, be used to record video or images captured by the one or more cameras 1950 integrated in or attached to frame 1910. Memory 1970 may include any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used in an HMD to store processed data, such as Flash or other "hard drive" technologies. This other storage may be separate from the externally coupled storage mentioned below.

While FIGS. 16A through 16C only show light sources 1980 and cameras 1920 and 1950 for one eye, embodiments may include light sources 1980 and cameras 1920 and 1950 for each eye, and gaze tracking may be performed for both eyes. In addition, the light sources, 1980, eye tracking camera 1920 and PoV camera 1950 may be located elsewhere than shown.

Embodiments of an HMD 1900 as illustrated in FIGS. 16A-16C may, for example, be used in augmented or mixed (AR) applications to provide augmented or mixed reality views to the wearer. HMD 1900 may include one or more sensors, for example located on external surfaces of the HMD 1900, that collect information about the wearer's external environment (video, depth information, lighting information, etc.); the sensors may provide the collected information to controller 1960 of the XR system. The sensors may include one or more visible light cameras 1950 (e.g., RGB video cameras) that capture video of the wearer's environment that, in some embodiments, may be used to provide the wearer with a virtual view of their real environment. In some embodiments, video streams of the real environment captured by the visible light cameras 1950 may be processed by the controller 1960 of the HMD 1900 to render augmented or mixed reality frames that include virtual content overlaid on the view of the real environment, and the rendered frames may be provided to the display system. In some embodiments, input from the eye tracking camera 1920 may be used in a PCCR gaze tracking process executed by the controller 1960 to track the gaze/pose of the user's eyes for use in rendering the augmented or mixed reality content for display. In addition, one or more of the methods as illustrated in FIGS. 1 through 15 may be implemented in the HMD to provide camera focusing in video passthrough mode for the HMD 1900.

Figure 17:
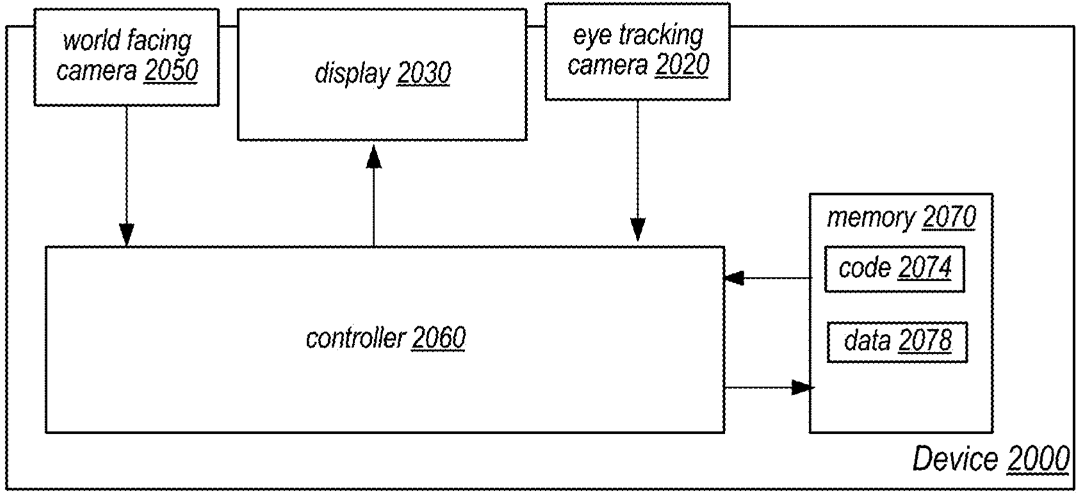
FIG. 17 is a block diagram illustrating an example device that may include components and implement methods as illustrated in FIGS. 1 through 15, according to some embodiments.

FIG. 17 is a block diagram illustrating an example device that may include components and implement methods as illustrated in FIGS. 1 through 15, according to some embodiments.

In some embodiments, an XR system may include a device 2000 such as a headset, helmet, goggles, or glasses. Device 2000 may implement any of various types of display technologies. For example, device 2000 may include a transparent or translucent display 2060 (e.g., eyeglass lenses) through which the user may view the real environment and a medium integrated with display 2060 through which light representative of virtual images is directed to the wearer's eyes to provide an augmented view of reality to the wearer.

In some embodiments, device 2000 may include a controller 2060 configured to implement functionality of the XR system and to generate frames (each frame including a left and right image) that are provided to display 2030. In some embodiments, device 2000 may also include memory 2070 configured to store software (code 2074) of the XR system that is executable by the controller 2060, as well as data 2078 that may be used by the XR system when executing on the controller 2060. In some embodiments, memory 2070 may also be used to store video captured by camera 2050. In some embodiments, device 2000 may also include one or more interfaces (e.g., a Bluetooth technology interface, USB interface, etc.) configured to communicate with an external device (not shown) via a wired or wireless connection. In some embodiments, at least a part of the functionality described for the controller 2060 may be implemented by the external device. The external device may be or may include any type of computing system or computing device, such as a desktop computer, notebook or laptop computer, pad or tablet device, smartphone, hand-held computing device, game controller, game system, and so on.

In various embodiments, controller 2060 may be a uniprocessor system including one processor, or a multiprocessor system including several processors (e.g., two, four, eight, or another suitable number). Controller 2060 may include central processing units (CPUs) configured to implement any suitable instruction set architecture, and may be configured to execute instructions defined in that instruction set architecture. For example, in various embodiments controller 2060 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2060 may employ any microarchitecture, including scalar, superscalar, pipelined, superpipelined, out of order, in order, speculative, non-speculative, etc., or combinations thereof. Controller 2060 may include circuitry to implement microcoding techniques. Controller 2060 may include one or more processing cores each configured to execute instructions. Controller 2060 may include one or more levels of caches, which may employ any size and any configuration (set associative, direct mapped, etc.). In some embodiments, controller 2060 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2060 may include one or more other components for processing and rendering video and/or images, for example image signal processors (ISPs), coder/decoders (codecs), etc.

Memory 2070 may include any type of memory, such as dynamic random access memory (DRAM), synchronous DRAM (SDRAM), double data rate (DDR, DDR2,DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used to store processed data, such as Flash or other "hard drive" technologies.

In some embodiments, device 2000 may include one or more sensors that collect information about the user's environment (video, depth information, lighting information, etc.). The sensors may provide the information to the controller 2060 of the XR system. In some embodiments, the sensors may include, but are not limited to, at least one visible light camera (e.g., an RGB video camera) 2050, ambient light sensors, and at least on eye tracking camera 2020. In some embodiments, device 2000 may also include one or more IR light sources; light from the light sources reflected off the eye may be captured by the eye tracking camera 2020. Gaze tracking algorithms implemented by controller 2060 may process images or video of the eye captured by the camera 2020 to determine eye pose and gaze direction. In addition, one or more of the methods as illustrated in FIGS. 1 through 15 may be implemented in device 2000 to provide camera focusing in video pass-through mode for the device 2000.

In some embodiments, device 2000 may be configured to render and display frames to provide an augmented or mixed reality (MR) view for the user based at least in part according to sensor inputs, including input from the eye tracking camera 2020. The MR view may include renderings of the user's environment, including renderings of real objects in the user's environment, based on video captured by one or more video cameras that capture high-quality, high-resolution video of the user's environment for display. The MR view may also include virtual content (e.g., virtual objects, virtual tags for real objects, avatars of the user, etc.) generated by the XR system and composited with the displayed view of the user's real environment.

Extended Reality

A real environment refers to an environment that a person can perceive (e.g., see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

The following clauses describe various examples of embodiments consistent with the description provided herein.

Clause 1. A device, comprising:
- a display subsystem configured to display virtual content to an eye;
- a gaze tracking subsystem;
- at least one camera configured to capture images of a scene; and
- a controller comprising one or more processors configured to:

determine first focus distance information based on gaze information from the gaze tracking subsystem and a depth map;

determine second focus distance information based on vergence of left and right gaze vectors as determined by the gaze tracking subsystem;

determine a focus distance from the first focus distance information and the second focus distance information; and direct the camera to focus at the focus distance.

Clause 2. The device as recited in clause 1, wherein, to determine a focus distance from the first focus distance information and the second focus distance information, the controller is configured to:

model the first focus distance information and the second focus distance information as probability distance functions (PDFs); and determine the focus distance from the two PDFs.

Clause 3. The device as recited in clause 2, wherein the PDF corresponding to the first focus distance information indicates two or more possible distances, and wherein, to determine the focus distance from the two PDFs, the controller is configured to select one of the two or more distances that most closely corresponds to a distance indicated by the PDF corresponding to the second focus distance information.

Clause 4. The device as recited in clause 1, wherein, to determine a focus distance from the first focus distance information and the second focus distance information, the controller is configured to:

collect first focus distance observations based on the gaze information from the gaze tracking subsystem and the depth map;

collect second focus distance observations based on the vergence of left and right gaze vectors as determined by the gaze tracking subsystem;

apply a linear regression function to the collected first and second focus distance observations to generate calibrated vergence distances; and determine the focus distance from the calibrated vergence distances.

Clause 5. The device as recited in clause 4, wherein said collect first focus distance observations, said collect second focus distance observations, and said apply a linear regression function are performed during an enrollment process for the device.

Clause 6. The device as recited in clause 4, wherein the observations are based on real objects in the scene that are imaged by the camera and displayed by the display subsystem or virtual objects rendered by the controller and displayed by the display subsystem.

Clause 7. The device as recited in clause 1, wherein, to determine a focus distance from the first focus distance information and the second focus distance information, the controller is configured to:

collect first focus distance observations based on the gaze information from the gaze tracking subsystem and the depth map;

collect second focus distance observations based on the vergence of left and right gaze vectors as determined by the gaze tracking subsystem;

train a model based on the collected first and second focus distance observations; and input at least one focus distance observation to the model, wherein the focus distance is output by the model in response to the input.

Clause 8. The device as recited in clause 7, wherein said collect first focus distance observations, said collect second focus distance observations, and said train a model are performed during an enrollment process for the device.

Clause 9. The device as recited in clause 1, wherein, to determine a focus distance from the first focus distance information and the second focus distance information, the controller is configured to:

display one or more targets at known ground truth positions;

direct a user to fixate on at least one of the one or more targets;

record left and right gaze vectors for the user while fixated on the targets;

compute intersection points of the left and right gaze vectors and compare the intersection points with the ground truth positions of respective targets;

store results of the comparison as calibrated vergence distances; and determine the focus distance from the calibrated vergence distances.

Clause 10. The device as recited in clause 1, wherein the device is a head-mounted device (HMD) of an extended reality (XR) system.

Clause 11. A device, comprising:

a display subsystem configured to display virtual content to an eye;

a gaze tracking subsystem;

at least one camera configured to capture images of a scene; and a controller comprising one or more processors configured to:

determine a focus distance based on vergence of left and right gaze vectors as determined by the gaze tracking subsystem;

direct the camera to focus at the focus distance;

determine a metric from an image captured by the camera;

adjust the focus distance if the metric is not within a specified range; and repeat said direct the camera, said determine a metric, and said adjust the focus distance until the metric is within the specified range.

Clause 12. The device as recited in clause 11, wherein the metric is an image sharpness metric.

Clause 13. The device as recited in clause 11, wherein the metric is disparity between left and right subpixels in one or more focus pixels.

Clause 14. The device as recited in clause 11, wherein the device is a head-mounted device (HMD) of an extended reality (XR) system.

Clause 15. A device, comprising:

a display subsystem configured to display virtual content to an eye;

a gaze tracking subsystem;

at least one camera configured to capture images of a scene; and a controller comprising one or more processors configured to:

estimate a gaze vector from gaze information captured by the gaze tracking subsystem;

determine an intersection of the gaze vector with a depth map of the scene;

determine a focus distance from an object or surface at the intersection of the gaze vector with the depth map; and direct the camera to focus at the determined focus distance.

Clause 16. The device as recited in clause 15, wherein the device is a head-mounted device (HMD) of an extended reality (XR) system.

Clause 17. A device, comprising:

a display subsystem configured to display virtual content to an eye;

a gaze tracking subsystem;

at least one camera configured to capture images of a scene; and a controller comprising one or more processors configured to:

estimate gaze vectors for left and right eyes from gaze information captured by the gaze tracking subsystem;

determine vergence of the gaze vectors in the scene;

determine a focus distance from the vergence of the gaze vectors; and direct the camera to focus at the determined focus distance.

Clause 18. The device as recited in clause 17, wherein the device is a head-mounted device (HMD) of an extended reality (XR) system.

Clause 19. A device, comprising:

a display subsystem configured to display virtual content to an eye;

at least one camera configured to capture images of a scene; and a controller comprising one or more processors configured to: direct the camera to focus at a first focus distance;

direct the display subsystem to display images including virtual content rendered from frames of the scene captured at the first focus distance;

receive a signal that the camera is to be switched to a second focus distance;

in response to the signal, direct the camera to focus at the second focus distance; and direct the display subsystem to display images including virtual content rendered from frames of the scene captured at the second focus distance.

Clause 20. The device as recited in clause 19, wherein the first focus distance corresponds to a far focus mode of the camera, and wherein the second focus distance corresponds to a near focus mode of the camera.

Clause 21. The device as recited in clause 20, wherein the far focus mode focuses the camera at 0.7 meters or more, and wherein the near focus mode focuses the camera at 0.4meters or less.

Clause 22. The device as recited in clause 19, wherein the signal is generated in response to user input to the device manually changing a focus mode of the camera from the first focus distance to the second focus distance.

Clause 23. The device as recited in clause 19, wherein the signal is generated in response to a user interaction with the device that indicates that a focus mode of the camera is to be switched from the first focus distance to the second focus distance.

Clause 24. The device as recited in clause 19, wherein the device is a head-mounted device (HMD) of an extended reality (XR) system.

Clause 25. A device, comprising:

a display subsystem configured to display virtual content to an eye;

a gaze tracking subsystem;

at least one camera configured to capture images of a scene to be displayed by the display subsystem; and a controller;

wherein the device is configured to support two focusing modes for the camera:

a first focusing mode in which the controller directs the camera to focus at different distances determined from gaze information from the gaze tracking subsystem and a depth map combined with vergence of left and right gaze vectors determined by the gaze tracking subsystem; and a second focusing mode in which the controller directs the camera to focus at either a near focus distance or a far focus distance in response to input to the device indicating that the second focusing mode is to be used.

Clause 26. The device as recited in clause 25, wherein the device is a head-mounted device (HMD) of an extended reality (XR) system.

Clause 27. A device, comprising:

a display subsystem configured to display virtual content to an eye;

a gaze tracking subsystem;

at least one camera configured to capture images of a scene to be displayed by the display subsystem; and a controller configured to:

direct the camera to focus at a focus distance determined from gaze information from the gaze tracking subsystem and a depth map combined with vergence of left and right gaze vectors determined by the gaze tracking subsystem;

determine an image sharpness metric from an image captured by the camera;

adjust the focus distance if the image sharpness metric is not within a specified range; and repeat said direct the camera, said determine an image sharpness metric, and said adjust the focus distance until the image sharpness metric is within the specified range.

Clause 28. The device as recited in clause 25, wherein the device is a head-mounted device (HMD) of an extended reality (XR) system.

Clause 29. A device, comprising:

a display subsystem configured to display virtual content to an eye;

a gaze tracking subsystem;

at least one camera configured to capture images of a scene; and a controller comprising one or more processors configured to:

determine a region of interest (ROI) based on an intersection of a gaze vector as determined by the gaze tracking subsystem with a focus pixel sensor image;

direct the camera to focus at the ROI;

determine sub-pixel disparity for the ROI in the focus pixel sensor image;

adjust the focus distance if disparity is detected between left and right subpixels in the region of interest; and repeat said direct the camera, said determine a metric, and said adjust the focus distance until the sub-pixel disparity is within a specified range.

Clause 30. The device as recited in clause 29, wherein the device is a head-mounted device (HMD) of an extended reality (XR) system.

Clause 31. A method, comprising:

performing, by a controller comprising one or more processors:

determining first focus distance information based on gaze information from a gaze tracking subsystem and a depth map;

determining second focus distance information based on vergence of left and right gaze vectors as determined by the gaze tracking subsystem;

determining a focus distance from the first focus distance information and the second focus distance information; and directing a camera to focus at the focus distance.

Clause 32. The method as recited in clause 31, wherein determining a focus distance from the first focus distance information and the second focus distance information comprises:

modeling the first focus distance information and the second focus distance information as probability distance functions (PDFs); and determining the focus distance from the two PDFs.

Clause 33. The method as recited in clause 31, wherein determining a focus distance from the first focus distance information and the second focus distance information comprises:

collecting first focus distance observations based on the gaze information from the gaze tracking subsystem and the depth map;

collecting second focus distance observations based on the vergence of left and right gaze vectors as determined by the gaze tracking subsystem;

applying a linear regression function to the collected first and second focus distance observations to generate calibrated vergence distances; and determining the focus distance from the calibrated vergence distances.

Clause 34. The method as recited in clause 31, wherein determining a focus distance from the first focus distance information and the second focus distance information comprises:

collecting first focus distance observations based on the gaze information from the gaze tracking subsystem and the depth map;

collecting second focus distance observations based on the vergence of left and right gaze vectors as determined by the gaze tracking subsystem;

training a model based on the collected first and second focus distance observations; and inputting at least one focus distance observation to the model, wherein the focus distance is output by the model in response to the input.

Clause 35. The method as recited in clause 31, wherein the controller, display subsystem, gaze tracking subsystem, and camera are components of a head-mounted device (HMD) of an extended reality (XR) system.

Clause 36. A method, comprising:

performing, by a controller comprising one or more processors:

determining a focus distance based on vergence of left and right gaze vectors as determined by a gaze tracking subsystem;

directing a camera to focus at the focus distance;

determining a sharpness from an image captured by the camera;

adjusting the focus distance if the sharpness metric is not within a specified range; and repeating said direct the camera, said determine a metric, and said adjust the focus distance until the sharpness metric is within the specified range.

Clause 37. The method as recited in clause 36, wherein the controller, display subsystem, gaze tracking subsystem, and camera are components of a head-mounted device (HMD) of an extended reality (XR) system.

Clause 38. A method, comprising:

performing, by a controller comprising one or more processors:

directing a camera to focus at a first focus distance;

directing a display subsystem to display images including virtual content rendered from frames of the scene captured at the first focus distance;

receiving a signal that the camera is to be switched to a second focus distance;

in response to the signal, directing the camera to focus at the second focus distance; and directing the display subsystem to display images including virtual content rendered from frames of the scene captured at the second focus distance;

wherein the first focus distance corresponds to a far focus mode of the camera, and wherein the second focus distance corresponds to a near focus mode of the camera.

Clause 39. The method as recited in clause 38, wherein the signal is generated in response to user input manually changing a focus mode of the camera from the first focus distance to the second focus distance.

Clause 40. The method as recited in clause 38, wherein the controller, display subsystem, gaze tracking subsystem, and camera are components of a head-mounted device (HMD) of an extended reality (XR) system.

Clause 41. A system, comprising:

a head-mounted device (HMD), comprising a display subsystem configured to display virtual content;

a gaze tracking subsystem;

at least one camera configured to capture images of a scene; and a controller comprising one or more processors configured to:

determine first focus distance information based on gaze information from the gaze tracking subsystem and a depth map;

determine second focus distance information based on vergence of left and right gaze vectors as determined by the gaze tracking subsystem;

determine a focus distance from the first focus distance information and the second focus distance information; and direct the camera to focus at the focus distance.

Clause 42. The system as recited in clause 41, wherein, to determine a focus distance from the first focus distance information and the second focus distance information, the controller is configured to:

model the first focus distance information and the second focus distance information as probability distance functions (PDFs); and determine the focus distance from the two PDFs.

Clause 43. The system as recited in clause 41, wherein, to determine a focus distance from the first focus distance information and the second focus distance information, the controller is configured to:

collect first focus distance observations based on the gaze information from the gaze tracking subsystem and the depth map;

collect second focus distance observations based on the vergence of left and right gaze vectors as determined by the gaze tracking subsystem;

apply a linear regression function to the collected first and second focus distance observations to generate calibrated vergence distances; and determine the focus distance from the calibrated vergence distances.

Clause 44. The system as recited in clause 41, wherein, to determine a focus distance from the first focus distance information and the second focus distance information, the controller is configured to:

collect first focus distance observations based on the gaze information from the gaze tracking subsystem and the depth map;

collect second focus distance observations based on the vergence of left and right gaze vectors as determined by the gaze tracking subsystem;

train a model based on the collected first and second focus distance observations; and input at least one focus distance observation to the model, wherein the focus distance is output by the model in response to the input.

Clause 45. The system as recited in clause 41, wherein the system is an extended reality (XR) system.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:

a display configured to display virtual content to at least one of a first eye or a second eye of a pair of eyes;

a gaze tracker;

at least one camera configured to capture images of a scene; and a controller comprising one or more processors configured to:

determine first focus distance information based on gaze information from the gaze tracker and a depth map;

determine second focus distance information based on vergence of a left gaze vector from the first eye and a right gaze vector from the second eye as determined by the gaze tracker, wherein the second focus distance information is determined based on a distance between the pair of eyes and an intersection point, from the vergence, of the first gaze vector and the second gaze vector;

determine a focus distance from the first focus distance information and the second focus distance information; and direct the camera to focus at the focus distance.

2. The device as recited in claim 1, wherein, to determine a focus distance from the first focus distance information and the second focus distance information, the controller is configured to:

model the first focus distance information and the second focus distance information as probability distance functions (PDFs); and determine the focus distance from the PDFs.

3. The device as recited in claim 2, wherein the PDF corresponding to the first focus distance information indicates two or more possible distances, and wherein, to determine the focus distance from the two PDFs, the controller is configured to select one of the two or more distances that most closely corresponds to a distance indicated by the PDF corresponding to the second focus distance information.

4. The device as recited in claim 1, wherein, to determine a focus distance from the first focus distance information and the second focus distance information, the controller is configured to:

collect first focus distance observations based on the gaze information from the gaze tracker and the depth map;

collect second focus distance observations based on the vergence of left and right gaze vectors as determined by the gaze tracker;

apply a linear regression function to the collected first and second focus distance observations to generate calibrated vergence distances; and determine the focus distance from the calibrated vergence distances.

5. The device as recited in claim 4, wherein said collect first focus distance observations, said collect second focus distance observations, and said apply a linear regression function are performed during an enrollment process for the device.

6. The device as recited in claim 4, wherein the observations are based on real objects in the scene that are imaged by the camera and displayed by the display or virtual objects rendered by the controller and displayed by the display.

7. The device as recited in claim 1, wherein, to determine a focus distance from the first focus distance information and the second focus distance information, the controller is configured to:

collect first focus distance observations based on the gaze information from the gaze tracker and the depth map;

collect second focus distance observations based on the vergence of left and right gaze vectors as determined by the gaze tracker;

train a model based on the collected first and second focus distance observations; and input at least one focus distance observation to the model, wherein the focus distance is output by the model in response to the input.

8. The device as recited in claim 7, wherein said collect first focus distance observations, said collect second focus distance observations, and said train a model are performed during an enrollment process for the device.

9. The device as recited in claim 1, wherein, to determine a focus distance from the first focus distance information and the second focus distance information, the controller is configured to:

cause display of one or more targets at known ground truth positions;

direct a user to fixate on at least one of the one or more targets;

record left and right gaze vectors for the user while fixated on the targets;

compute intersection points of the left and right gaze vectors and compare the intersection points with the ground truth positions of respective targets;

store results of the comparison as calibrated vergence distances; and determine the focus distance from the calibrated vergence distances.

10. The device as recited in claim 1, wherein the device is a head-mounted device (HMD) of an extended reality (XR) system.

11. A method, comprising:

performing, by a controller comprising one or more processors:

determining first focus distance information based on gaze information from a gaze tracker and a depth map;

determining second focus distance information based on vergence of a left gaze vector from a first eye of a pair of eyes and a right gaze vector from a second eye of the pair of eyes as determined by the gaze tracker, wherein the second focus distance information includes a distance between the pair of eyes and an intersection point, from the vergence, between the first gaze vector and the second gaze vector;

determining a focus distance from the first focus distance information and the second focus distance information including the distance between the pair of eyes and the intersection point between the first gaze vector and the second gaze vector; and directing a camera to focus at the focus distance.

12. The method as recited in claim 11, wherein determining a focus distance from the first focus distance information and the second focus distance information comprises:

modeling the first focus distance information and the second focus distance information as probability distance functions (PDFs); and determining the focus distance from the PDFs.

13. The method as recited in claim 12, wherein the PDF corresponding to the first focus distance information indicates two or more possible distances, and wherein determining the focus distance from the two PDFs comprises selecting one of the two or more distances that most closely corresponds to a distance indicated by the PDF corresponding to the second focus distance information.

14. The method as recited in claim 11, wherein determining a focus distance from the first focus distance information and the second focus distance information comprises:

collecting first focus distance observations based on the gaze information from the gaze tracker and the depth map;

collecting second focus distance observations based on the vergence of left and right gaze vectors as determined by the gaze tracker;

applying a linear regression function to the collected first and second focus distance observations to generate calibrated vergence distances; and determining the focus distance from the calibrated vergence distances.

15. The method as recited in claim 14, wherein the observations are based on real objects in a scene that are imaged by the camera and displayed by a display or virtual objects rendered by the controller and displayed by the display.

16. The method as recited in claim 11, wherein determining a focus distance from the first focus distance information and the second focus distance information comprises:

collecting first focus distance observations based on the gaze information from the gaze tracker and the depth map;

collecting second focus distance observations based on the vergence of left and right gaze vectors as determined by the gaze tracker;

training a model based on the collected first and second focus distance observations; and inputting at least one focus distance observation to the model, wherein the focus distance is output by the model in response to the input.

17. The method as recited in claim 16, wherein said collect first focus distance observations, said collect second focus distance observations, and said train a model are performed during an enrollment process for the device.

18. The method as recited in claim 11, wherein determining a focus distance from the first focus distance information and the second focus distance information comprises:

displaying one or more targets at known ground truth positions;

directing a user to fixate on at least one of the one or more targets;

recording left and right gaze vectors for the user while fixated on the targets;

computing intersection points of the left and right gaze vectors and compare the intersection points with the ground truth positions of respective targets;

storing results of the comparison as calibrated vergence distances; and determining the focus distance from the calibrated vergence distances.

19. The method as recited in claim 11, wherein the controller, a display, the gaze tracker, and the camera are components of a head-mounted device (HMD) of an extended reality (XR) system.

20. A system, comprising:

a head-mounted device (HMD), comprising:

a display configured to display virtual content;

a gaze tracker;

at least one camera configured to capture images of a scene; and a controller comprising one or more processors configured to:

determine first focus distance information based on gaze information from the gaze tracker and a depth map;

determine second focus distance information based on vergence of a left gaze vector from a first eye of a pair of eyes and a right gaze vector from a second eye of the pair of eyes as determined by the gaze tracker, wherein the second focus distance information includes a distance between the pair of eyes and an intersection point, from the vergence, between the first gaze vector and the second gaze vector;

determine a focus distance from the first focus distance information and the second focus distance information including the distance between the pair of eyes and the intersection point between the first gaze vector and the second gaze vector; and direct the camera to focus at the focus distance.

* * * * *